United States Patent
Kim

(10) Patent No.: US 12,486,493 B2
(45) Date of Patent: Dec. 2, 2025

(54) PRECURSOR CELLS OF INDUCED PLURIPOTENT STEM CELL (IPSC)-DERIVED MESENCHYMAL STEM CELLS AND METHOD FOR PREPARING THE SAME

(71) Applicant: BREXOGEN INC., Seoul (KR)

(72) Inventor: Sue Kim, Seoul (KR)

(73) Assignee: BREXOGEN INC., Seoul (KR)

( * ) Notice: Subject to any disclaimer, the term of this patent is extended or adjusted under 35 U.S.C. 154(b) by 1010 days.

(21) Appl. No.: 17/562,443

(22) Filed: Dec. 27, 2021

(65) Prior Publication Data
US 2022/0119771 A1    Apr. 21, 2022

Related U.S. Application Data

(60) Division of application No. 16/780,050, filed on Feb. 3, 2020, now abandoned, which is a continuation of application No. PCT/KR2019/018426, filed on Dec. 24, 2019.

(30) Foreign Application Priority Data

Jul. 26, 2019  (KR) .......................... 10-2019-0091269
Dec. 23, 2019  (KR) .......................... 10-2019-0173078

(51) Int. Cl.
*C12N 5/0775*    (2010.01)
*C12P 1/00*    (2006.01)

(52) U.S. Cl.
CPC .............. *C12N 5/0662* (2013.01); *C12P 1/00* (2013.01); *C12N 2500/00* (2013.01); *C12N 2500/84* (2013.01); *C12N 2501/115* (2013.01); *C12N 2506/45* (2013.01)

(58) Field of Classification Search
None
See application file for complete search history.

(56) References Cited

U.S. PATENT DOCUMENTS

| | | | |
|---|---|---|---|
| 7,569,385 B2 | 8/2009 | Haas | |
| 8,962,321 B2 | 2/2015 | Kimbrel et al. | |
| 10,080,730 B2 | 9/2018 | Jeffs et al. | |
| 2008/0081370 A1* | 4/2008 | Hematti | C12N 5/0662 |
| | | | 435/395 |
| 2011/0182866 A1 | 7/2011 | Mcniece | |
| 2015/0118198 A1 | 4/2015 | Sadiq et al. | |
| 2016/0130556 A1 | 5/2016 | Hantash | |
| 2019/0017032 A1 | 1/2019 | Firas et al. | |
| 2019/0117701 A1 | 4/2019 | Ikeyama et al. | |
| 2019/0269739 A1 | 9/2019 | Brodie et al. | |
| 2020/0338136 A1* | 10/2020 | Kim | A61K 8/99 |
| 2021/0060081 A1* | 3/2021 | Kim | C12N 5/0652 |

FOREIGN PATENT DOCUMENTS

| | | |
|---|---|---|
| KR | 10-2019-0083932 A | 7/2019 |
| WO | WO-2007/123363 A1 | 11/2007 |
| WO | WO-2015/050963 A1 | 4/2015 |
| WO | WO-2017/156580 A1 | 9/2017 |
| WO | WO-2018/009147 A1 | 1/2018 |
| WO | WO-2019/135645 A1 | 7/2019 |

OTHER PUBLICATIONS

Weist et al., Stem Cells and Development, 2018, vol. 27, No. 3, pp. 166-183. (Year: 2018).*
Kim et al, Int J Mol Sci, 2018, vol. 19, 16 pages. (Year: 2018).*
Office Action of China Patent Application No. 201980098785.1, issued on Jul. 15, 2023.
EESR of Europe Patent Application No. 19939428.9, issued on Sep. 12, 2022.
Office Action from corresponding U.S. Appl. No. 16/780,050, issued on Feb. 1, 2021.
Office Action from corresponding U.S. Appl. No. 16/780,050, issued on Apr. 12, 2021.
Office Action (Final) from corresponding U.S. Appl. No. 16/780,050, issued on Oct. 25, 2021.
Epigenetic rejuvenation of mesenchymal stromal . . . _ Stem Cell Reports Sep. 9, 2014;3(3)414-22.
Exosomes Secreted from Induced Pluripotent Stem . . . _Int J Mol Sci.Oct. 11, 2018;19(10)3119.
Human placenta and bone marrow derived MSC . . . _Differentiation. Apr. 2007;75(4)279-91.
One-step derivation of mesenchymal stem cell . . . _PLoS One 2012;7(3)e33225.
Reviewing and updating the major molecular . . . _Stem Cells Dev. May 1, 2013;22(9)1455-76.
Minimal criteria for defining multipotent . . . _Cytotherapy.2006;8(4)315-7.
Comparative characteristics of mesenchymal stem . . . _Exp Hematol. Nov. 2005;33(11)1402-16.
Derivation and immunological characterization of . . . _Exp Hematol. Epub Jan. 7, 2008.
Different populations and sources of human . . . _Cell Commun Signal. May 2011 14 9 12.
Human Mesenchymal Stromal Cells from Different . . . _Stem Cells Int.Epub Dec. 6, 2015.
International Search Report from corresponding PCT/KR2019/018426, dated Apr. 24, 2020.

(Continued)

*Primary Examiner* — Allison M Fox
(74) *Attorney, Agent, or Firm* — Harness, Dickey & Pierce, P.L.C.

(57) ABSTRACT

The present disclosure relates to precursor cells of induced pluripotent stem cell-derived mesenchymal stem cells and a preparation method therefor. The precursor cells of induced pluripotent stem cell-derived mesenchymal stem cells of the present disclosure have enhanced functionality and excellent proliferative capacity compared with typical mesenchymal stem cells or induced pluripotent stem cell-derived mesenchymal stem cells.

5 Claims, 18 Drawing Sheets

(56) References Cited

OTHER PUBLICATIONS

Consentius, et al. (2018) "In Situ Detection of CD73+ CD90+ CD105+ Lineage: Mesenchymal Stromal Cells in Human Placenta and Bone Marrow Specimens by Chipcytometry." *Cytometry Part A*, 93A:889-893.
Tsao, et al. (2014) Mesenchymal Stem Cell Derived Exosomes: A New Hope for the Treatment of Cardiovascular Disease?, *Acta Cardiol Sin*, 30:395-400.
Notification of Reason for Refusal of KR Patent Application No. 10-2019-0173078 issued on Mar. 18, 2021.

\* cited by examiner

PRECURSOR CELLS OF INDUCED PLURIPOTENT STEM CELL (IPSC)-DERIVED MESENCHYMAL STEM CELLS AND METHOD FOR PREPARING THE SAME

CROSS REFERENCE TO RELATED APPLICATION

This application is a divisional of U.S. patent application Ser. No. 16/780,050 filed on Feb. 3, 2020, which is a continuation application of PCT Application No. PCT/KR2019/018426 filed on Dec. 24, 2019, which claims priority to Korean Patent Application No. 10-2019-0173078 filed on Dec. 23, 2019 and to Korean Patent Application No. 10-2019-0091269 filed on Jul. 26, 2019. The entire disclosures of the applications identified in this paragraph are incorporated herein by references.

FIELD

The present disclosure relates to precursor cells of induced pluripotent stem cell-derived mesenchymal stem cells and a method for preparing the same.

BACKGROUND

Mesenchymal stem cells are multipotent stromal cells that can differentiate into a variety of cells including osteocyte, chondrocytes, myocytes, and adipocytes. Mesenchymal stem cells can differentiate into various connective tissues, such as cartilage or bone tissue, ligament, and bone marrow stroma, and thus have been studied for the treatment of a variety of diseases, such as soft tissue defects resulting from arthritis, wounds, burns, or the like. Since mesenchymal stem cells have, besides such structural support functions, immunomodulatory or immunosuppressive functions, such as expressing anti-inflammatory cytokines and transforming macrophages into M2-type macrophages, many studies have been conducted to use the mesenchymal stem cells as agents for suppressing immune responses and treating immune diseases caused by excessive activation of the immune system, such as arthritis, inflammatory bowel diseases, atopic dermatitis, and autoimmune diseases.

Recent studies are being actively conducted on therapeutic effects on various diseases by using exosomes secreted from mesenchymal stem cells but not using mesenchymal stem cells per se. For commercial use, a large amount of high-quality exosomes are required. However, the amount of exosomes that can be obtained from mesenchymal stem cells is very small and the functions and proliferative capacity of the mesenchymal stem cells also decrease with repeated passages, and thus there is a need for developing techniques to establish cells having equivalent or better functionality than mesenchymal stem cells as well as excellent proliferative capacity.

SUMMARY

Technical Problem

The present inventors endeavored to develop stem cells having equivalent or better functionality than conventional mesenchymal stem cells as well as excellent proliferative capacity.

As a result, the present inventors established mesenchymal precursor cells that remain in a more undifferentiated state than mesenchymal stem cells derived from induced pluripotent stem cells and revealed excellent functionality and proliferative capacity thereof and thus completed the present disclosure.

Therefore, an aspect of the present disclosure is to provide precursor cells of induced pluripotent stem cell (iPSC)-derived mesenchymal stem cells, a cell population including same, and preparation methods therefor.

Another aspect of the present disclosure is to provide a method for producing exosomes from the precursor cells of induced pluripotent stem cell (iPSC)-derived mesenchymal stem cells.

Technical Solution

In accordance with an aspect of the present disclosure, there is provided a cell population containing precursor cells of mesenchymal stem cells (MSC).

As used herein, the term "stem cells" refers to undifferentiated cells that have the potential to differentiate into two or more different types of cells while having self-renewal capacity. The stem cells of the present disclosure may be autologous or allogeneic stem cells.

As used herein, the term "mesenchymal stem cells" refer to multipotent cells that can differentiate into a variety of cells including osteocytes, chondrocytes, myocytes, and adipocytes. The mesenchymal stem cells may be most frequently bone marrow-derived mesenchymal stem cells, but may be derived from umbilical cord or cord blood, adipose tissue, amniotic fluid, or tooth buds of molar teeth, in addition to bone marrow. The mesenchymal stem cells are also called stromal cells.

Herein, the precursor cells of mesenchymal stem cells, developed by the present inventors, are precursor cells of mesenchymal stem cells derived from induced pluripotent stem cells (iPSCs) but not general mesenchymal stem cells.

The term "induced pluripotent stem cells" refers to cells that had been induced to have pluripotent differentiation potential through an artificial reprogramming process from differentiated cells, and also called reprogrammed stem cells. The artificial reprogramming process is performed by the introduction of viral-mediated reprogramming factors using retroviruses, lentiviruses, and Sendai viruses, or non-viral-mediated reprogramming factors using non-viral vectors, proteins, and cellular extracts, or the process includes reprogramming by stem cell extracts, compounds and the like. Induced pluripotent stem cells have almost the same characteristics as embryonic stem cells, and specifically show similar cell morphology, are similar in view of gene and protein expression patterns, have in vitro and in vivo pluripotency, form teratoma, form chimeric mice when inserted into mouse blastocysts, and enable germline transmission of genes.

The induced pluripotent stem cells of the present disclosure include induced pluripotent stem cells derived from all species, such as humans, monkeys, pigs, horses, cows, sheep, dogs, cats, mice, rats, and rabbits, but are preferably human-derived induced pluripotent stem cells.

In addition, somatic cells before reprogramming into the induced pluripotent stem cells may be somatic cells derived from umbilical cord, cord blood, bone marrow, fat, muscle, nerve, skin, amniotic membrane, amniotic fluid, or placenta, but are not limited thereto. Specifically, the somatic cells include fibroblasts, hepatocytes, adipose cells, epithelial cells, epidermal cells, chondrocytes, muscle cells, cardiac muscle cells, melanocytes, neural cells, glial cells, astroglial cells, monocytes, and macrophages, but are not limited thereto.

In an embodiment of the present disclosure, the cell population is characterized in that a marker protein expressed on the cell surface of at least 80% of cells is CD73+, CD90+, CD105+, or a combination thereof. In a specific embodiment of the present disclosure, the cell population is characterized in that a marker protein expressed on the cell surface of at least 80%, 85%, 90%, or 95% of cells is CD73+, CD90+, CD105+, or a combination thereof.

In another embodiment of the present disclosure, the cell population is characterized in that a marker protein expressed on the cell surface of at most 5% of cells is CD34+ and/or CD45+. In a specific embodiment of the present disclosure, the cell population is characterized in that a marker protein expressed on the cell surface of at most 5%, 4%, or 3% of cells is CD34+ and/or CD45+.

Herein, CD means a cluster of differentiation antigens on the cell surface. The symbol "+" or "(+)" means that a corresponding surface marker is present on the cell surface (positive), and the symbol "−" or "(−)" means that a corresponding surface marker is not present on the cell surface (negative). The presence (positive) or absence (negative) of the marker does not mean the physically absolute presence or absence, but means the presence or absence according to a relative standard whereby the marker is determined as being present (positive) if the number thereof is experimentally detectable in the state of the art and the marker is determined as being absent (negative) if not experimentally detectable.

In another embodiment of the present disclosure, the precursor cells of mesenchymal stem cells express at least one gene, selected from the group consisting of ANKRD1, CPE, NKAIN4, LCP1, CCDC3, MAMDC2, CLSTN2, SFTA1P, EPB41 L3, PDE1C, EMILIN2, SULT1C4, TRIM58, DENND2A, CADM4, AIF1L, NTM, SHISA2, RASSF4, and ACKR3, at a higher level compared with an equivalent number of mesenchymal stem cells.

The higher level means at least 3 times, 5 times, 7 times, or 10 times higher levels than the amount of gene expression expressed by an equivalent number of mesenchymal stem cells.

In still another embodiment of the present disclosure, the precursor cells of mesenchymal stem cells express at least one gene, selected from the group consisting of DHRS3, BMPER, IF16, PRSS12, RDH10, and KCNE4, at a lower level compared with an equivalent number of mesenchymal stem cells.

The lower level means at least 3 times, 5 times, 7 times, or 10 times lower levels than the amount of gene expression expressed by an equivalent number of mesenchymal stem cells.

In a specific embodiment of the present disclosure, the precursor cells of mesenchymal stem cells and an equivalent number of mesenchymal stem cells are derived from the same kind of tissue. More specifically, the precursor cells of mesenchymal stem cells are precursor cells of mesenchymal stem cells derived from induced pluripotent stem cells, which are derived from the same kind of tissue.

In an embodiment of the present disclosure, the precursor cells of mesenchymal stem cells are precursor cells of mesenchymal stem cells derived from umbilical cord tissue-derived induced pluripotent stem cells, and the equivalent number of mesenchymal stem cells compared therewith are umbilical cord tissue-derived mesenchymal stem cells.

The present inventors named the precursor cells of induced pluripotent stem cell-derived mesenchymal stem cells as Brexogen stem cells (BxC). Herein, the "precursor cells of induced pluripotent stem cell-derived mesenchymal stem cells (BxC)" is also expressed as "induced pluripotent stem cell-derived mesenchymal precursor cells" or "induced pluripotent stem cell-derived functionally enhanced mesenchymal precursor cells".

As used herein, the "progenitor cells (BxC) of mesenchymal stem cells derived from induced pluripotent stem cells" are deposited under Accession number "KCTC14019BP" to the "Korean Collection for Type Culture (KCTC)".

As verified in examples of the present disclosure, the precursor cells of mesenchymal stem cells of the same kind of tissue (e.g., umbilical cord tissue)-derived induced pluripotent stem cells (BxC) of the present disclosure had no chromosome karyotype abnormalities and had excellent proliferative capacity compared with the same kind of tissue (e.g., umbilical cord tissue)-derived mesenchymal stem cells (MSC). Specifically, the BxC of the present disclosure, when nine or more passages were repeated, showed a 10-fold or more difference in proliferative capacity compared with the same kind of tissue-derived mesenchymal stem cells (MSC), and showed no reduction in proliferative capacity even when twelve or more passages were repeated. Compared with MSCs, BxC also showed 2-fold or higher expression levels of Ki67, which is a marker associated with cell proliferative capacity.

In an embodiment of the present disclosure, the precursor cells of induced pluripotent stem cell-derived mesenchymal stem cells (BxC) of the present disclosure secret large amounts of proteins, such as endostatin, endothelin-1, VEGF-A, thrombospondin-2, PIGF, PDGF-AA, beta-NGF, and HB-EGF, compared with an equivalent number of mesenchymal stem cells.

Herein, endostatin is a 20-kDa C-terminal fragment derived from naturally generated type XVIII collagen, and has been reported as an anti-angiogenic agent.

Herein, endothelin-1, which is also known as preproendothelin-1 (PPET1), is a protein encoded by EDN1 gene and produced in vascular endothelial cells. In addition, endothelin-1 has been known as a strong vasoconstrictor.

Herein, vascular endothelial growth factor A (VEGF-A) is a protein encoded by VEGFA gene, and has been known to induce vascular growth through interactions with VEGFR1 and VEGFR2 of vascular endothelial cells.

Herein, thrombospondin-2 is a protein encoded by THBS2 gene, and has been known to mediate cell-cell interactions or cell-matrix interactions. Although the role of thrombospondin-2 in cancer is controversial, thrombospondin-2 has been reported to regulate cell surface characteristics of mesenchymal stem cells and is known to be involved in cell adhesion and cell migration.

Herein, the placental growth factor (PIGF) is a protein encoded by PGF protein, and is a member of the VEGF sub-family and has been known as a protein that plays a main role in angiogenesis in the embryonic development stage.

Herein, the platelet-derived growth factor (PDGF-AA) is a growth factor that regulates cell growth and division, and has been known to play a key role in formation and growth of blood vessels and proliferation, chemotaxis, and migration of mesenchymal stem cells.

Herein, the nerve growth factor (NGF) is a neurotrophic factor and neuropeptide mainly involved in growth, maintenance, proliferation, and survival of neurons. NGF is a complex of three proteins (alpha-NGF, beta-NGF, and gamma-NGF) expressed at a ratio of about 2:1:2. It has been known that gamma-NGF functions as serine protease, and cleaves the N-terminal of beta-NGF to activate NGF.

Herein, the heparin-binding EGF-like growth factor (HB-EGF) is a member of the EGF family encoded by HBEGF gene. It has been known that HB-EGF plays a key role in heart development and vascular distribution and is an essential protein in the epithelialization in cutaneous wound healing.

In accordance with another aspect of the present disclosure, there is provided a method for preparing precursor cells of induced pluripotent stem cell (iPSC)-derived mesenchymal stem cells, the method including:

isolating SSEA-4 (−) cells and culturing the SSEA-4 (−) cells in a medium containing FBS and bFGF for 1-10 days.

Since the precursor cells of mesenchymal stem cells of the present disclosure are the same as the above-described precursor cells of mesenchymal stem cells, the overlapping descriptions therebetween are omitted.

According to an embodiment of the present disclosure, the induced pluripotent stem cells are produced by culturing somatic cells, derived from umbilical cord, cord blood, bone marrow, fat, muscle, nerve, skin, amniotic membrane, amniotic fluid, or placenta of humans, in a reprogramming medium.

Specifically, the somatic cells include fibroblasts, hepatocytes, adipose cells, epithelial cells, epidermal cells, chondrocytes, muscle cells, cardiac muscle cells, melanocytes, neural cells, glial cells, astroglial cells, monocytes, macrophages, or mesenchymal stem cells derived from bone marrow, umbilical cord, cord blood, adipose tissue, amniotic fluid, or tooth buds of molar teeth, but are not limited thereto.

Herein, stage-specific embryonic antigen-4 (SSEA-4) is one of characteristic cell surface markers of human induced pluripotent stem cells and embryonic stem cells. In an embodiment of the present disclosure, SSEA-4 may be used as a screening factor for differentiating the cells that retain characteristics of induced pluripotent stem cells and the cells that have lost characteristics of induced pluripotent stem cells in a differentiation procedure into the precursor cells of mesenchymal stem cells (BxC) of the present disclosure.

According to an example of the present disclosure, the present inventors cultured induced pluripotent stem cells, isolated SSEA-4 (−) cells through screening on the basis of whether or not to express SSEA-4, and then conducted additional culture.

In an embodiment of the present disclosure, the induced pluripotent stem cells and SSEA-4 (−) cells may be cultured for specifically 1-10 days, 3-10 days, or 5-10 days, and more specifically 5-7 days or 7-10 days.

In an embodiment of the present disclosure, the isolation of SSEA-4 (−) cells after the culture of the induced pluripotent stem cells for 1-10 days may be carried out using fluorescence-activated cell sorting (FACS) or magnetic-activated cell sorting (MACS), and preferably FACS, but is not limited thereto, and thus any cell isolation method known in the art can be used without limitation.

In another embodiment of the present disclosure, the medium for culturing the cells contains 5-20%, 5-15%, 5-10%, 10-15%, or 10-20% FBS, and most specifically, 10% FBS, but is not limited thereto.

In another embodiment of the present disclosure, the medium for culturing the cells contain 1-20 ng/ml, 2-20 ng/ml, 3-20 ng/ml, 5-20 ng/ml, 7-20 ng/ml, 10-20 ng/ml, 1-15 ng/ml, 2-15 ng/ml, 3-15 ng/ml, 5-15 ng/ml, 7-15 ng/ml, 10-15 ng/ml, 1-10 ng/ml, 2-10 ng/ml, 3-10 ng/ml, 5-10 ng/ml, or 7-10 ng/ml bFGF, and most specifically, 10 ng/ml bFGF.

In accordance with still another aspect, there is provided a method for producing exosomes, the method including:

culturing the cell population of any one of claims 1 to 5 in a cell culture medium; and separating exosomes from the cell culture medium.

In an embodiment of the present disclosure, the cell culture medium contains exosome-depleted bovine fatal serum.

In a specific embodiment of the present disclosure, the reason why exosome-depleted FBS is used in the cell culture medium is to prevent the incorporation of FBS-derived exosomes except for exosomes secreted by stem cells since the ordinarily used FBS contains a large amount of exosomes.

As used herein, the term "exosomes" are nanosized membrane vesicles released by fusion of an organelle of the endocytic pathway, the multivesicular body, with the plasma membrane, and the exosomes are present in the body fluids of almost all eukaryotes. Exosomes are 30-150 nm in diameter, which is larger than LDL but much smaller than red blood cells. Exosomes are released from cells when multivesicular bodies are fused to cell membranes, or directly released from cell membranes. It is well known that exosomes perform important and specialized functions, such as cellular immunity mediating and intercellular signaling. The marker proteins of the exosomes are well known to be CD9, CD63, CD81, and the like. The exosomes are not strictly limited to a size of 30-150 nm, and the concept thereof encompasses multivesicular body falling into the size range, microvesicle with above the size composed of a lipid bilayer, and a mixture thereof.

In an embodiment of the present disclosure, the culture may be conducted for 12-120 hours, 24-96 hours, 48-96 hours, or 60-84 hours, and most specifically, for 72 hours, but is not limited thereto.

In an embodiment of the present disclosure, the progenitor cells of the mesenchymal stem cells may be pretreated with various materials before separating the exosomes. For example, the progenitor cells of the mesenchymal stem cells of the present disclosure may be pretreated with one or more materials selected from the group consisting of interferon-gamma, pioglitazone, metformin, AICAR (5-Aminoimidazole-4-carboxamide ribonucleotide), Thrombin, resveratrol, substance P, hyaluronic acid, tetrandrine, Phorbol 12-myristate 13-acetate (PMA), exendin-4, dexamethasone, insulin, ascorbate, and cartilage growth factor, Insulin-like Growth Factor (IGF), Transforming Growth Factor β1 (TGF-β1) and the like, but not limited to.

In another embodiment of the present disclosure, the step of isolating exosomes from the cell culture medium is such that exosomes secreted to the cell culture medium from the cultured precursor cells of mesenchymal stem cells are isolated.

In an embodiment of the present disclosure, the separation method of the exosome is as follows.

The culture medium was centrifuged at 200-400×g for 5-20 minutes to remove residual cells and cell debris, and then the supernatant is taken and subjected to high-speed centrifugation at 9,000-12,000×g for 60-80 minutes. Here, the supernatant was again taken, and subjected to centrifugation at 90,000-120,000×g for 80-100 minutes, and then the supernatant was removed, and as a result, the exosomes remaining below can be obtained.

According to a specific embodiment of the present disclosure, the mesenchymal stem cell culture medium is collected, centrifuged at 300×g for 10 minutes to remove residual cells and cell debris, and then centrifuged at 10,000×g and 4° C. for 70 minutes using a high-speed centrifuge. The centrifuged supernatant is again collected, and centrifuged at 100,000×g and 4° C. for 90 minutes using an ultracentrifuge to remove the supernatant, and as a result, the exosomes remaining below are separated.

The above-described method for producing exosomes is common with the above-described precursor cells of mesenchymal stem cells in that exosomes are produced by culturing the above-described precursor cells of mesenchymal stem cells. The above-described method for isolating exosomes is exemplary, and any method for isolating exosomes, which is employed in the art, can also be used without limitation.

The exosomes prepared by the claimed method may or may not contain a therapeutic agent.

In an embodiment of the present disclosure, the therapeutic agent is a therapeutic protein, an antibody (e.g., full length antibody, monoclonal antibody, scFv, Fab fragment, F(ab')2, diabody, triabody, or minibody), inhibitory RNA, or small molecule drug.

In an embodiment of the present disclosure, the therapeutic protein is a protein whose loss or inactivation is associated with the treatment of the disease. For example, it is a tumor suppressor, kinase, phosphatase, or transcription factor.

In one embodiment of the present disclosure, the antibody binds to an intracellular antigen. Such intracellular antigens may be proteins, such as oncogenes, whose activity is required for cell proliferation and/or survival. In some cases, the antibody blocks the function of the antigen. In some cases, the antibody interferes with protein-protein interactions.

In an embodiment of the present disclosure, the inhibitory RNA is siRNA, shRNA, miRNA, or pre-miRNA. In various embodiments, the inhibitory RNA blocks the expression of a protein, e.g., an oncogene, whose activity is required for maintenance of a particular disease state. If the oncogene is a mutated form of gene, then the inhibitory RNA preferentially blocks the expression of the mutant oncogene but not the wild type protein.

In an embodiment of the present disclosure, the small molecule drug is a contrast agent. In another embodiment of the present disclosure, the small molecule drug is a chemotherapeutic agent.

In an embodiment of the present disclosure, the composition is formulated for oral administration or parenteral administration, e.g., intravenous, intramuscular, subcutaneous, or intraperitoneal injection.

In an embodiment of the present disclosure, the therapeutic agent comprises an antimicrobial agent. The antimicrobial agent may be benzalkonium chloride, benzethonium chloride, benzyl alcohol, bronopol, centrimide, cetylpyridinium chloride, chlorhexidine, chlorobutanol, chlorocresol, chloroxylenol, cresol, ethyl alcohol, glycerin, exetidine, imidurea, phenol, phenoxyethanol, phenylethl alcohol, phenlymercuric nitrate, propylene glycol, or thimerosal, but not limited thereto.

In accordance with still another aspect, there is provided a precursor cell of induced pluripotent stem cell (iPSC)-derived mesenchymal stem cell.

In an embodiment of the present disclosure, the iPSC is derived from human umbilical cord. In another embodiment of the present disclosure, the precursor cell is deposited under Accession number KCTC14019BP.

Advantageous Effects

The present disclosure provides precursor cells of induced pluripotent stem cell-derived mesenchymal stem cells and a preparation method therefor. The precursor cells of induced pluripotent stem cell-derived mesenchymal stem cells of the present disclosure have enhanced functionality and excellent proliferative capacity compared with typical mesenchymal stem cells or induced pluripotent stem cell-derived mesenchymal stem cells.

DETAILED DESCRIPTION

Hereinafter, the present disclosure will be described in more detail with reference to examples. These examples are only for illustrating the present disclosure more specifically, and it will be apparent to those skilled in the art that the scope of the present disclosure is not limited by these examples.

EXAMPLES

Throughout the present specification, the term "%" used to express the concentration of a specific material, unless otherwise particularly stated, refers to (wt/wt) % for solid/solid, (wt/vol) % for solid/liquid, and (vol/vol) % for liquid/liquid.

Example 1: Isolation and Culture of Precursor Cells of Induced Pluripotent Stem Cell (iPSC)-Derived Mesenchymal Stem Cells (BxC)

First, induced pluripotent stem cells (iPSC) were cultured in DMEM containing 10% FBS and 10 ng/ml bFGF for 7 days. Then, the stage-specific embryonic antigen 4 (SSEA-4) (−) cells without SSEA-4 protein expression on the cell surface were isolated from the cultured induced pluripotent stem cells through FACS. The isolated SSEA-4 (−) cells were passaged, and further cultured in the same medium as above for 7 days, thereby preparing the precursor cells of induced pluripotent stem cell-derived mesenchymal stem cells of the present disclosure. The present inventors named the precursor cells of induced pluripotent stem cell-derived mesenchymal stem cells as Brexogen stem cells (BxC) and the BxC is deposited under Accession number "KCTC14019BP" to the "Korean Collection for Type Culture (KCTC)".

The precursor cells of induced pluripotent stem cell-derived mesenchymal stem cells named BxC were further cultured in a culture medium [high glucose DMEM (Gibco, Cat no. 11995-065), 10% Fetal bovine Serum (HyClone), 1% MEM Non-Essential Amino Acids Solution (100×) (Gibco, Cat no. 11140-050)].

The proportions of the cell surface marker SSEA-4 for respective cell types in the induced pluripotent stem cells on day 0 (iPSC) (DO), the induced pluripotent stem cells after 7-day culture (Pre-BxC) (D7), and the precursor cells of induced pluripotent stem cell-derived precursor cells of the present disclosure (BxC) are shown in Table 1 below and FIGS. 1a to 1c and 2.

Figure 1A:
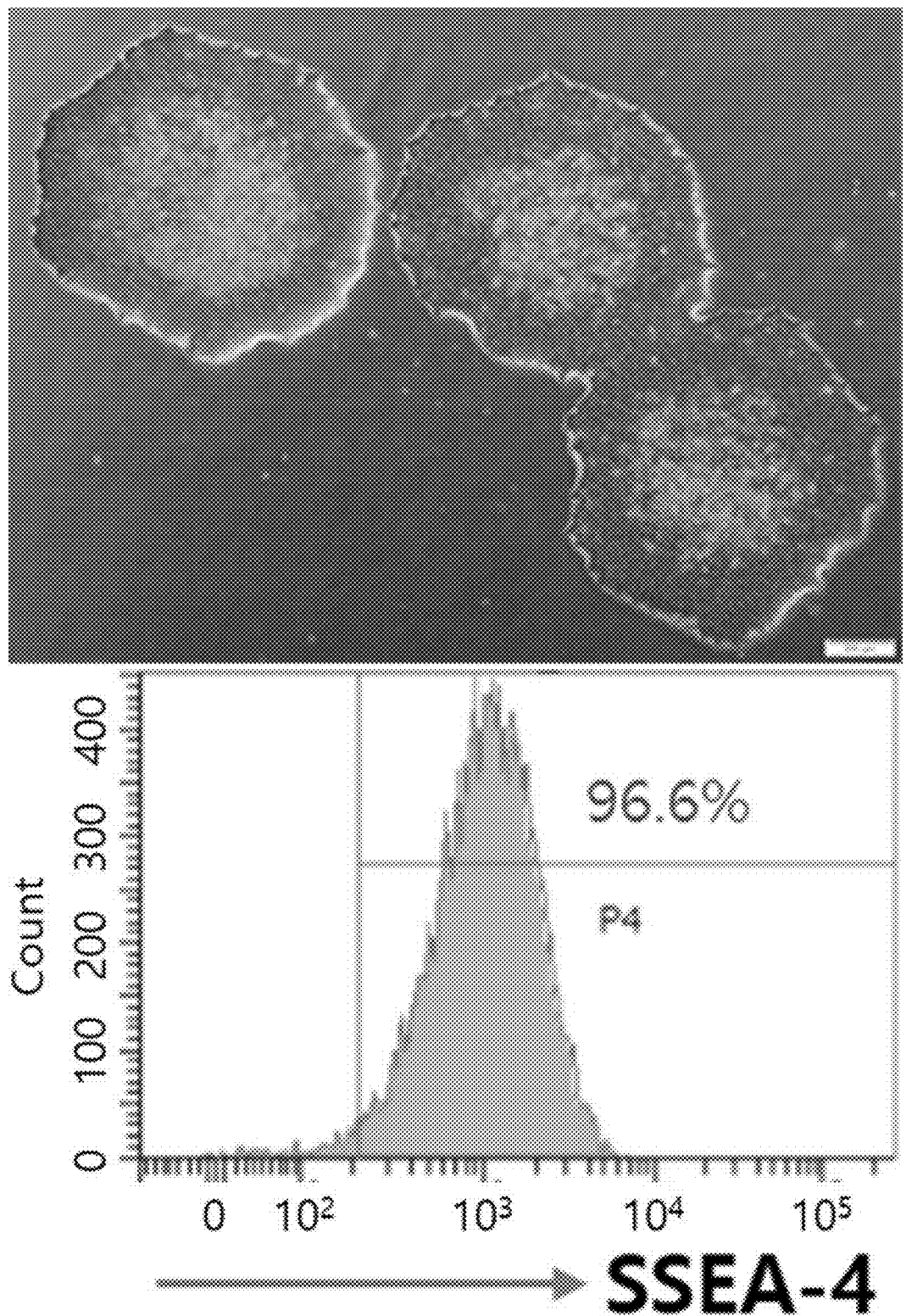
FIGS. 1a and 1b show the expression rates of the cell surface expression marker SSEA-4 in the induced pluripotent stem cells (iPSC) on day 0 and after 7-day culture and microscopic images of the cells.
Figure 1B:
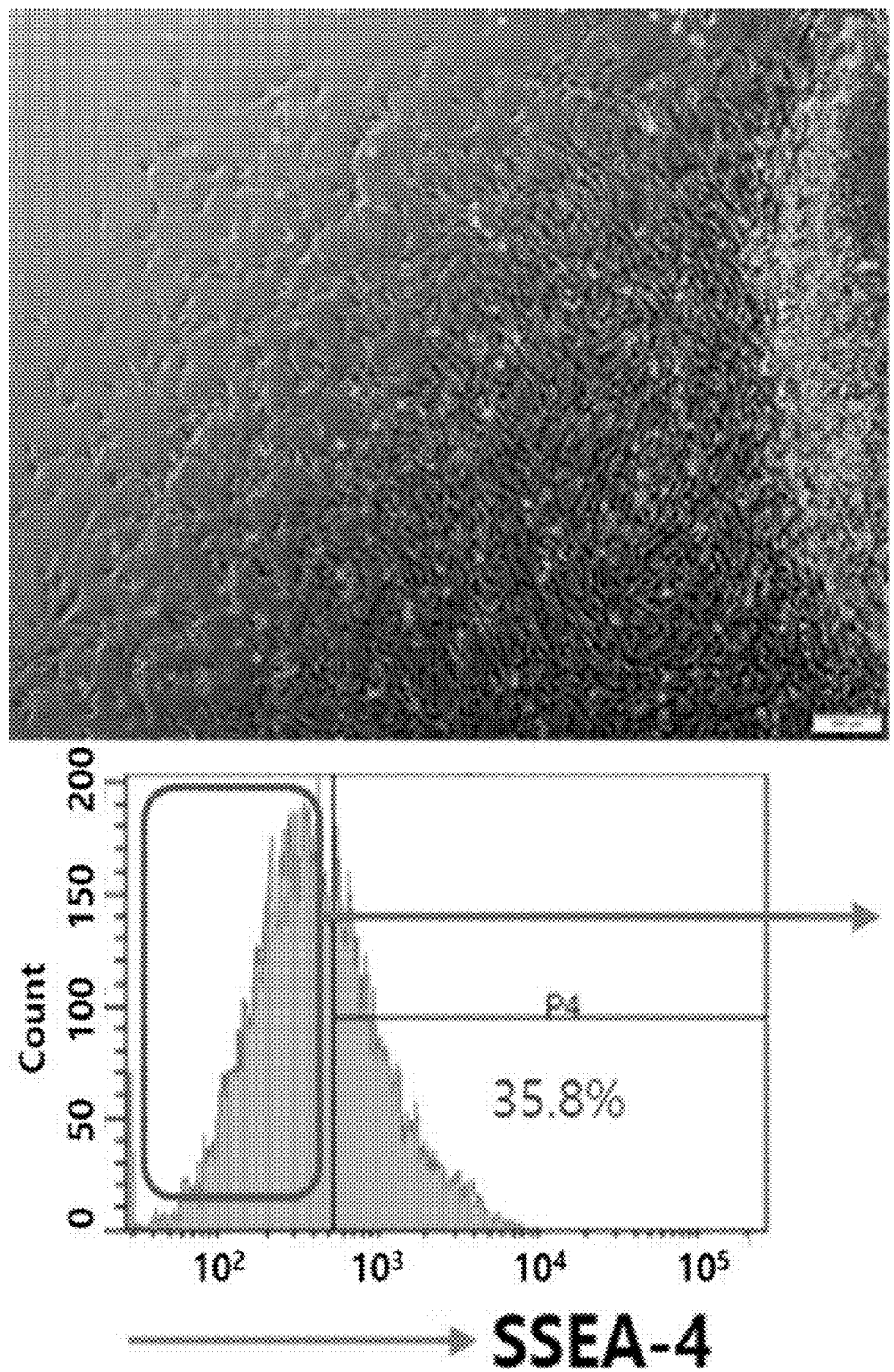
Figure 1C:
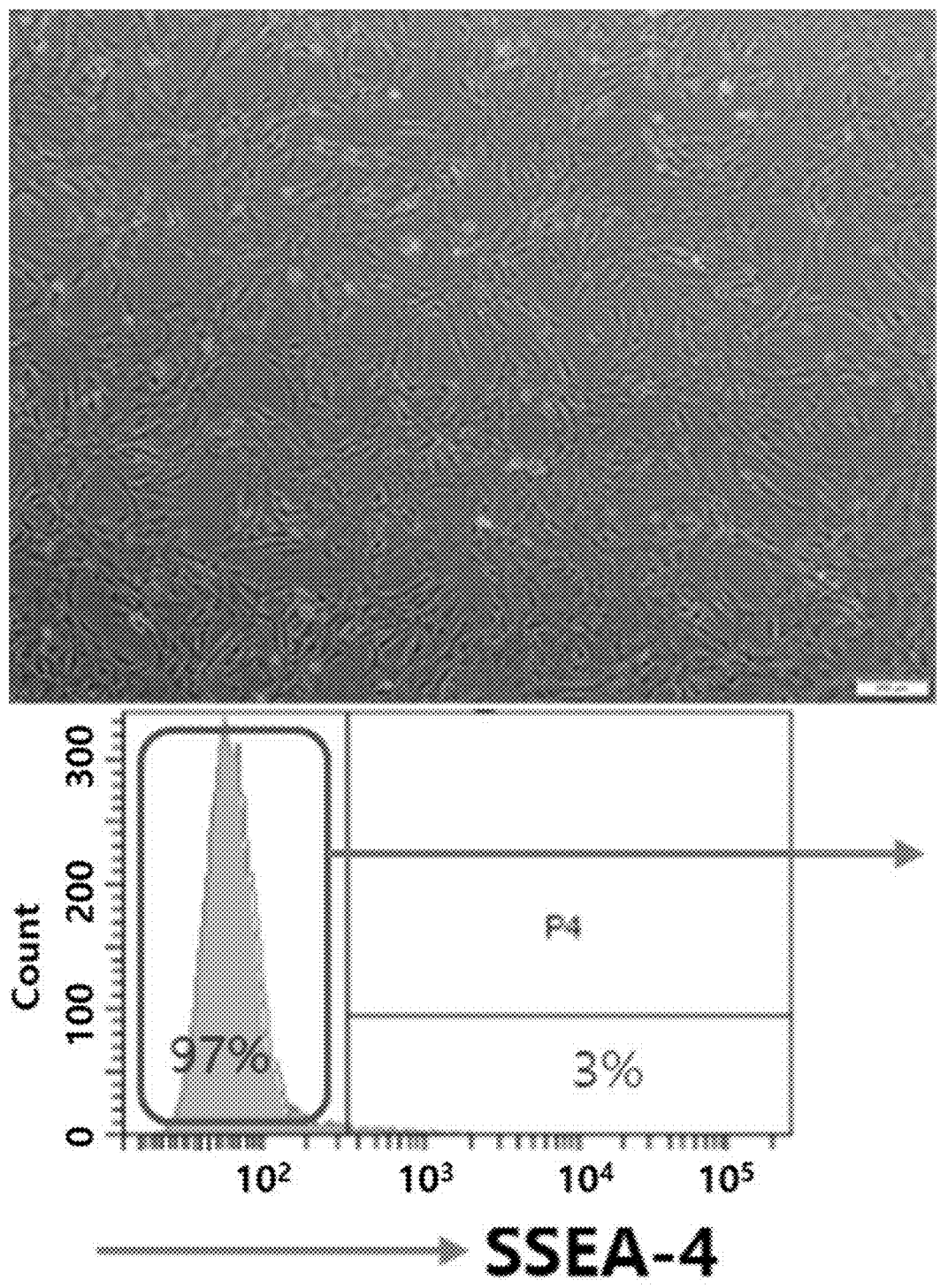
FIG. 1c shows the expression rate of the cell surface expression marker SSEA-4 in the cells (BxC) of the present disclosure obtained by culturing the induced pluripotent stem cells for 7 days, isolating cells corresponding to SSEA-4 (−), and then culturing the isolated cells for 7 days, and microscopic images of the cells.

As a result, 96.6% of the initial induced pluripotent stem cell population expressed SSEA-4 protein on the cell surface (FIG. 1a), but after 7-day culture, the SSEA-4 protein-expressing SSEA-4 (+) cell population was reduced to 35.8% of the total cells (FIG. 1b). SSEA-4 (−) cells, which account for the remaining 64.2% of the total cells, were isolated, passaged, and cultured for 7 days (BxC cells). As a result, it was confirmed that SSEA-4 protein-expressing cells were 3% or less of the total cell population (FIG. 1c).

It can be therefore seen that the expression rate of SSEA-4 protein was 5% or less in the cell population of the induced pluripotent stem cell (iPSC)-derived functionally enhanced mesenchymal precursor cells (BxC).

Example 2: Expression of Cell Surface Marker in Induced Pluripotent Stem Cell (iPSC)-Derived Functionally Enhanced Mesenchymal Precursor Cells (BxC)

The cell surface markers (SSEA-4, CD34, CD45, CD73, CD90, CD105) for respective cell types in the induced pluripotent stem cells on day 0 (iPSC) (DO), the induced pluripotent stem cell-derived differentiated cells after 7-day culture (Pre-BxC) (D7), the precursor cells of induced pluripotent stem cell-derived mesenchymal stem cells (BxC), and the mesenchymal stem cells (MSC) were analyzed as below.

The cells on each stage were made into a single cell suspension by treatment with TrypLE™ Express (Gibco, 12604-021), and then washed with PBS. The single cell suspension was divisionally placed in tubes such that the wavelengths of antibodies specifically binding to SSEA-4 (BD560128), CD73 (BD550257), CD90 (BD5555950), CD105 (BD560839), CD45 (BD555483), and CD34 (BD348053) do not overlap, and then centrifuged. The cell pellets were resuspended in 100 μL of FACS buffer, and 6 μL of antibodies were placed together two each such that wavelengths thereof do not overlap, allowed to stand at room temperature in a dark state for 30 minutes, washed with PBS, resuspended in 300 μL of FACS buffer, and then analyzed by the FACS machine.

Figure 2:
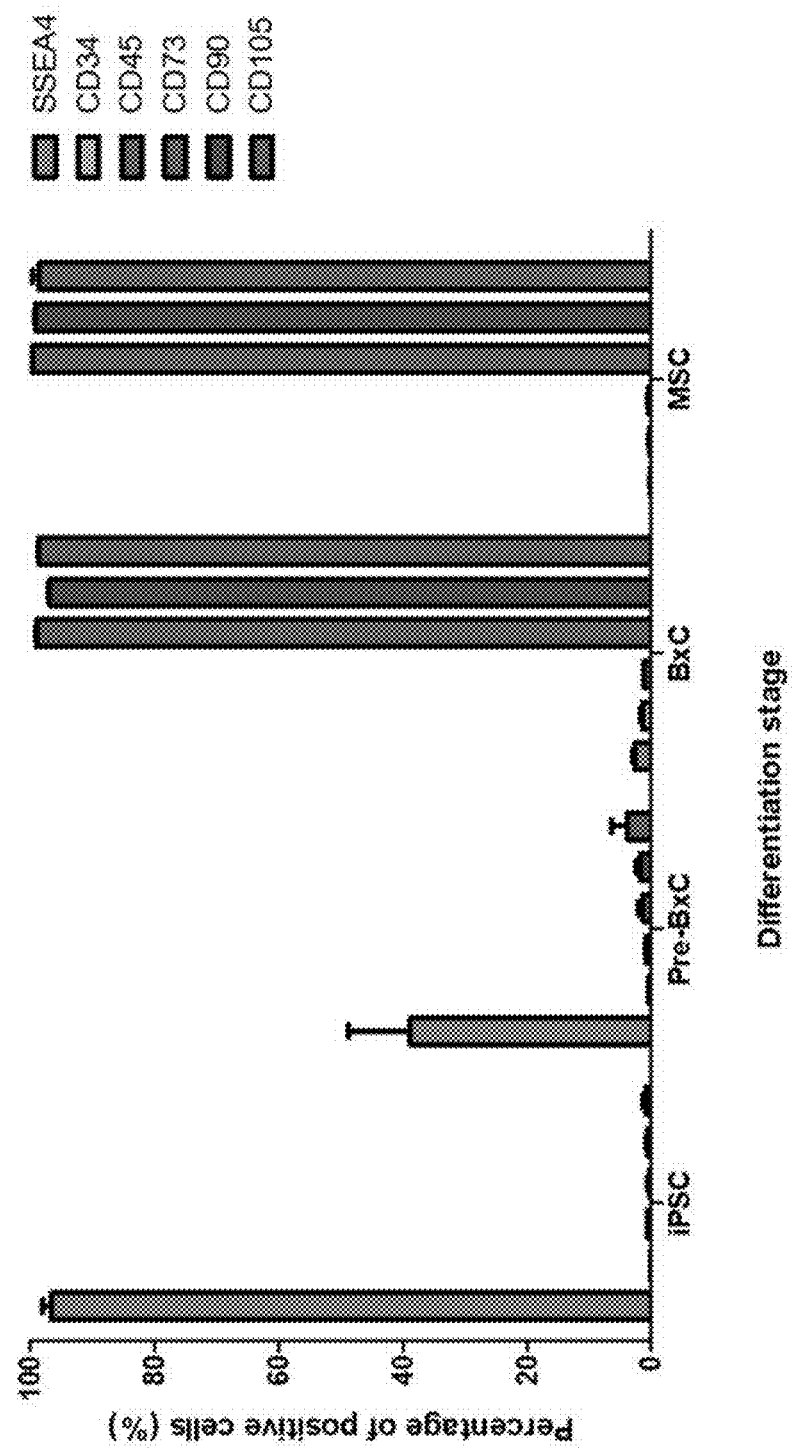
FIG. 2 is a graph showing the types of cell surface markers in the induced pluripotent stem cells on day 0 (iPSC), the induced pluripotent stem cells after 7-day culture (pre-BxC), the cells after SSEA-4 (−) isolation and then 7-day culture (BxC), and mesenchymal stem cells (MSC).

The expression rates of the cell surface markers (SSEA-4, CD34, CD45, CD73, CD90, and CD105) in the stem cells are shown in Table 1 and FIG. 2.

It can be seen from the above results that the expression rates of CD73, CD90, and CD105 proteins were 90% or more in the cell population of the induced pluripotent stem cell (iPSC)-derived functionally enhanced mesenchymal stem cells (BxC) of the present disclosure.

TABLE 1

| Differentiation Stage | SSEA-4 (%) | CD34 (%) | CD45 (%) | CD73 (%) | CD90 (%) | CD105 (%) |
|---|---|---|---|---|---|---|
| iPSC | 96.7 | 0.1 | 0.7 | 0.3 | 0.6 | 0.9 |
| Pre-BxC | 38.8 | 0.4 | 0.9 | 1.3 | 1.7 | 3.8 |
| BxC | 2.7 | 1.4 | 1.2 | 99.0 | 96.9 | 98.6 |
| MSC | 0.2 | 0.3 | 0.5 | 99.7 | 99.2 | 98.6 |

Example 3: Analysis of Chromosomes of Induced Pluripotent Stem Cell (iPSC)-derived Functionally Enhanced Mesenchymal Precursor Cells (BxC)

In order to investigate whether the induced pluripotent stem cell-derived functionally enhanced mesenchymal precursor cells (BxC) of the present disclosure and the induced pluripotent stem cell-derived mesenchymal stem cells (MSC) had chromosome abnormality, BxC and MSC that have been passaged six times were karyotyped.

Figure 3:
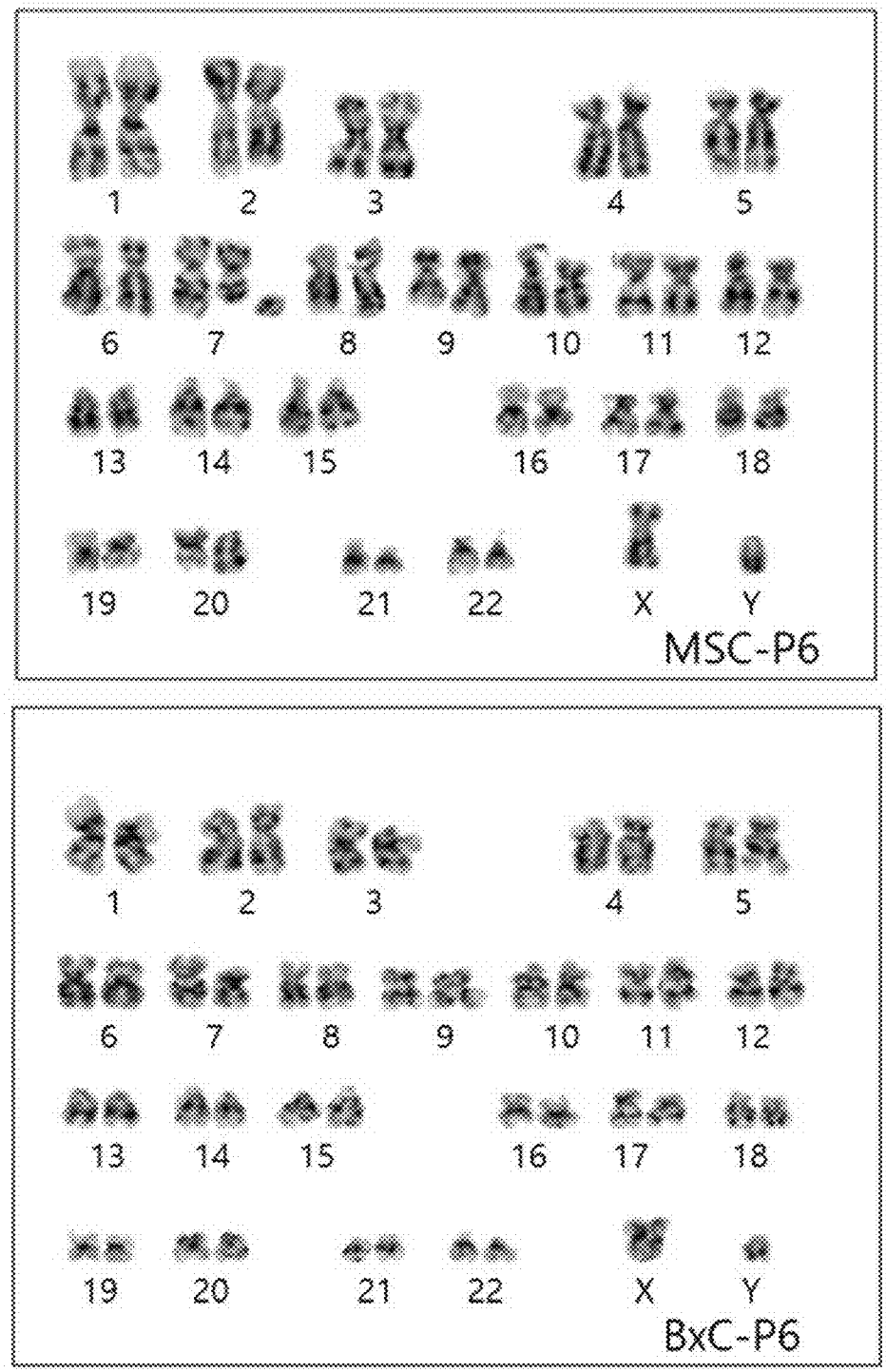
FIG. 3 shows karyotyping results of the precursor cells of induced pluripotent stem cell-derived mesenchymal stem cells (BxC) of the present disclosure and the same kind of tissue-derived mesenchymal stem cells (MSC).

It was confirmed as shown in FIG. 3 that the BxC of the present disclosure and MSC had no abnormalities in the number and structures of chromosomes.

Example 4: Comparison of Proliferative Capacity of Induced Pluripotent Stem Cell (iPSC)-derived Functionally Enhanced Mesenchymal Precursor Cells (BxC)

In order to compare proliferative capacity between the induced pluripotent stem cell-derived functionally enhanced mesenchymal stem cells (BxC) of the present disclosure and the induced pluripotent stem cell-derived mesenchymal stem cells (MSC), the following experiment was conducted.

The induced pluripotent stem cell-derived functionally enhanced mesenchymal stem cells (BxC) and the same kind of tissue (umbilical cord)-derived mesenchymal stem cells (MSC) with the same passage number (P4) were seeded in 6-well culture plates at 1×105 cells per well. After the culture media were removed every 3.5 days (twice a week), the cells were washed with PBS, and then detached by treatment with TrypLE™ Express. The cells were centrifuged at 300×g for 5 minutes, and then resuspended in 1 mL of a culture medium, followed by cell counting. After cell counting, the cells were again seeded at 1×105 cells per well, and then an increase in cell count for each passage was investigated while culture was repeated every 3.5 days.

In order to investigate the expression rate of the cell proliferation indicator Ki67 in each cell type, the following experiment was conducted.

The induced pluripotent stem cell-derived functionally enhanced mesenchymal precursor cells (BxC) and the same kind of tissue (umbilical cord)-derived mesenchymal stem cells (MSC) with the same passage number (P4) were made into a single cell suspension by treatment with TrypLE™ Express (Gibco, 12604-021), and then washed with PBS. After cell washing, the cells were placed in 80% cold ethanol to be fixed at −20° C. for 2 hours or longer, and then washed three times with PBS. Then, 20 μL of Ki-67-specific antibody per 100 μL of buffer, which were contained in the PE Mouse Anti-Ki-67 kit (BD556027), was transferred into a new tube, allowed to stand at room temperature for 30 minutes, washed with PBS, and incubated with an indicator-attached secondary antibody, allowed to stand at room temperature in a dark state for 30 minutes, and analyzed by the FACS machine.

Figure 4A:
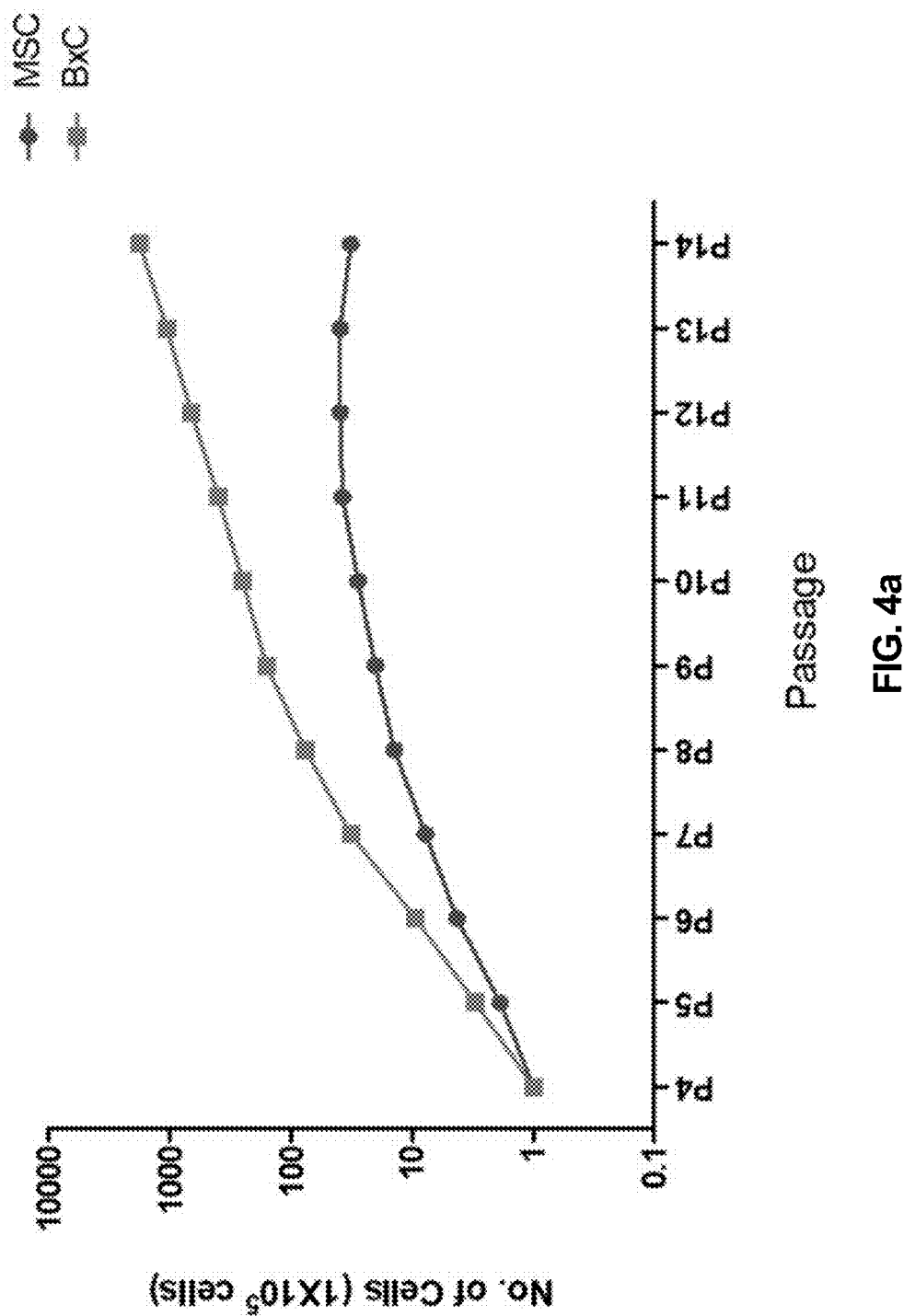
FIG. 4a shows the number of cells through passage culture in the precursor cells of the induced pluripotent stem cell-derived mesenchymal stem cells (BxC) of the present disclosure and the same kind of tissue-derived mesenchymal stem cells (MSC).

As shown in FIG. 4a, the induced pluripotent stem cell-derived functionally enhanced mesenchymal precursor cells (BxC) of the present disclosure showed a 10-fold or higher difference in proliferative capacity from the 9th passage, compared with the mesenchymal stem cells (MSC). In addition, the proliferative capacity of the mesenchymal stem cells (MSC) was reduced from the 12th passage, but the proliferative capacity of the induced pluripotent stem cell-derived functionally enhanced mesenchymal stem cells (BxC) of the present disclosure was not reduced in spite of 12 or more passages.

Figure 4B:
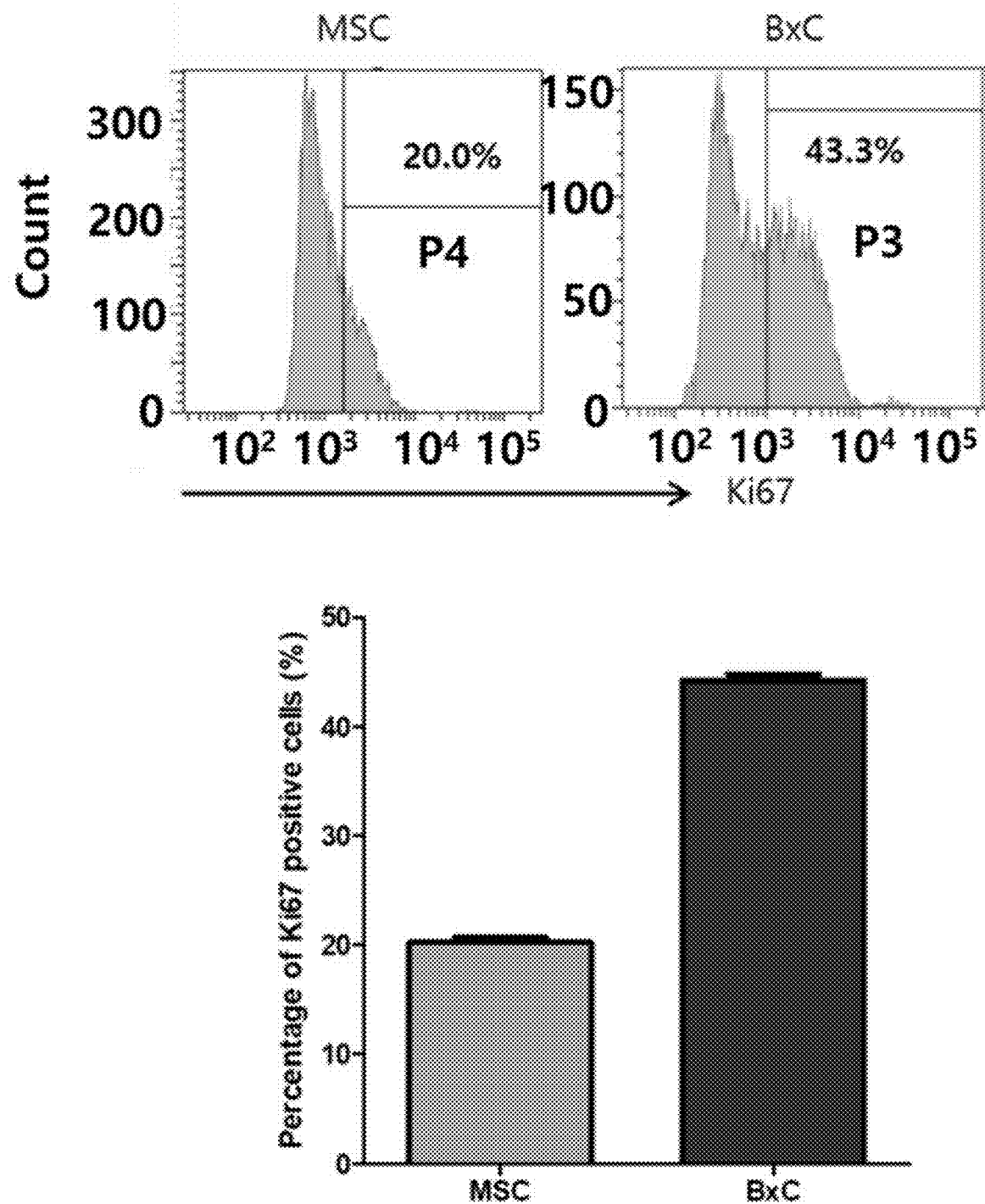
FIG. 4b shows the comparison of expression rate of the cell proliferative factor Ki-67 between the precursor cells of the induced pluripotent stem cell-derived mesenchymal stem cells (BxC) of the present disclosure and the same kind of tissue-derived mesenchymal stem cells (MSC).
Figure 5A:
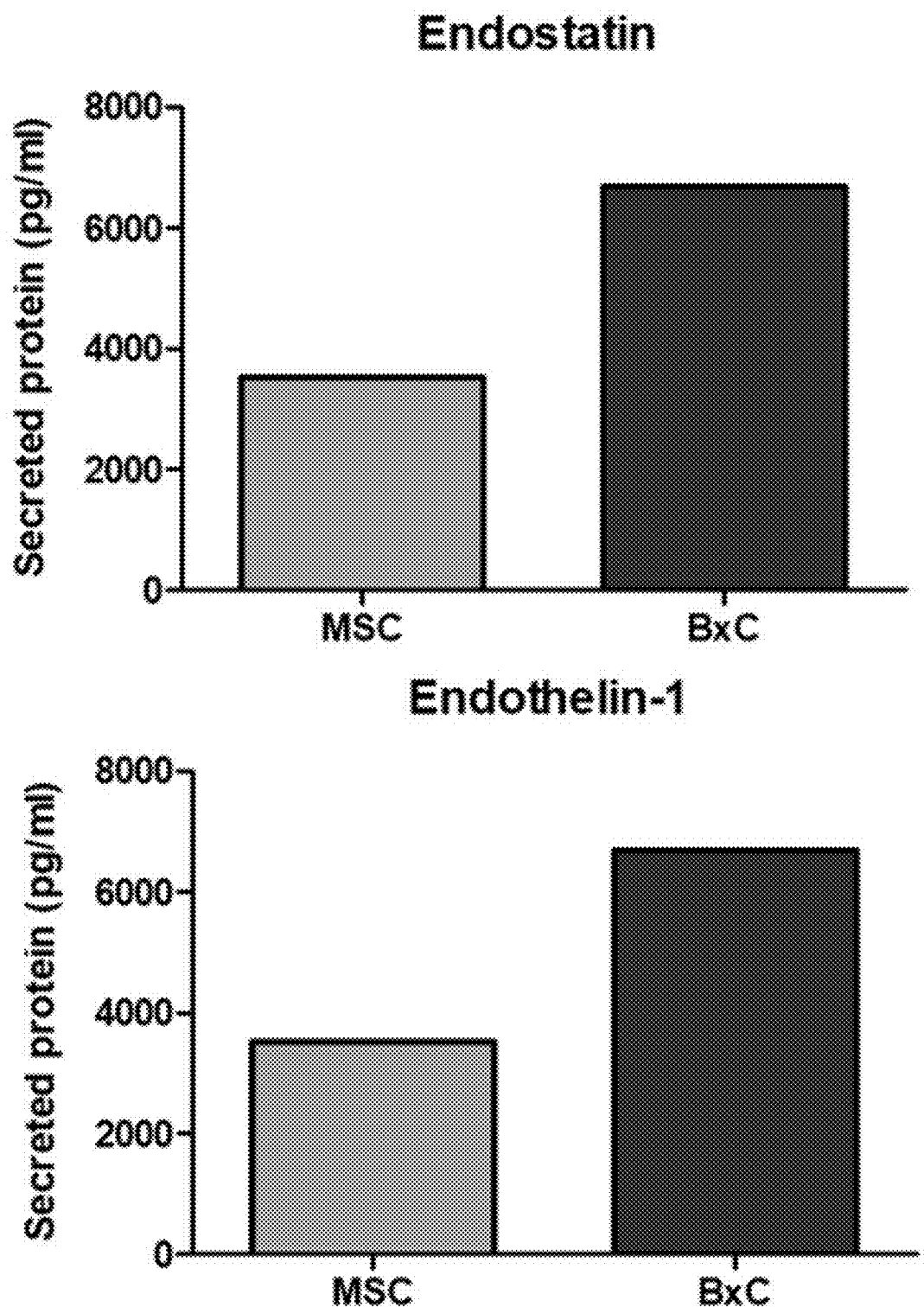
FIGS. 5a, 5b, 5c and 5d shows the comparison of the secretion amounts of functional proteins expressed in the precursor cells of the induced pluripotent stem cell-derived mesenchymal stem cells (BxC) of the present disclosure. (5a: endostatin, endothelin-1; 5b: VEGF-A, thrombospondin-2; 5c: PlGF, PDGF-AA; 5d: beta-NGF, HB-EGF)
Figure 5B:
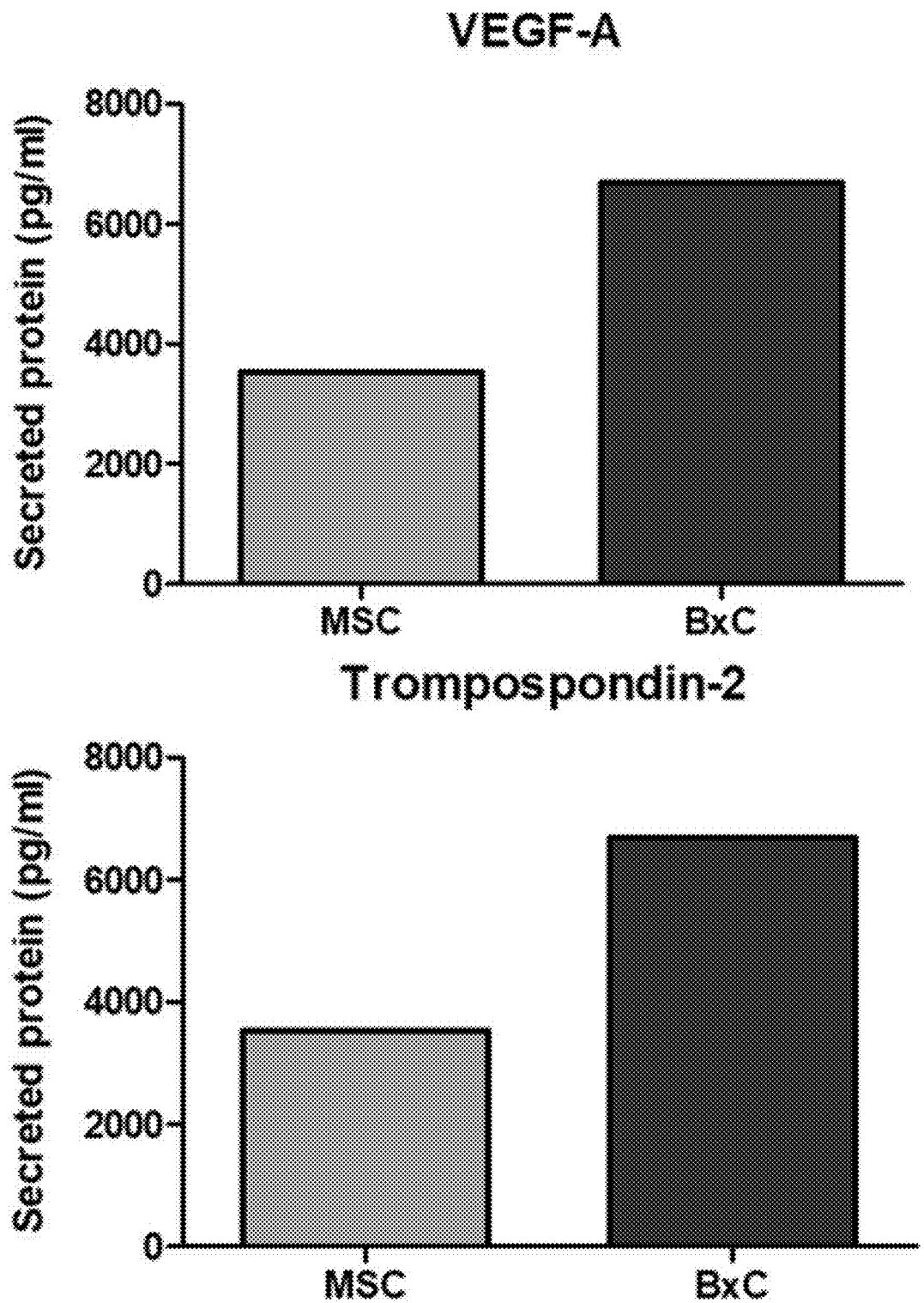
Figure 5C:
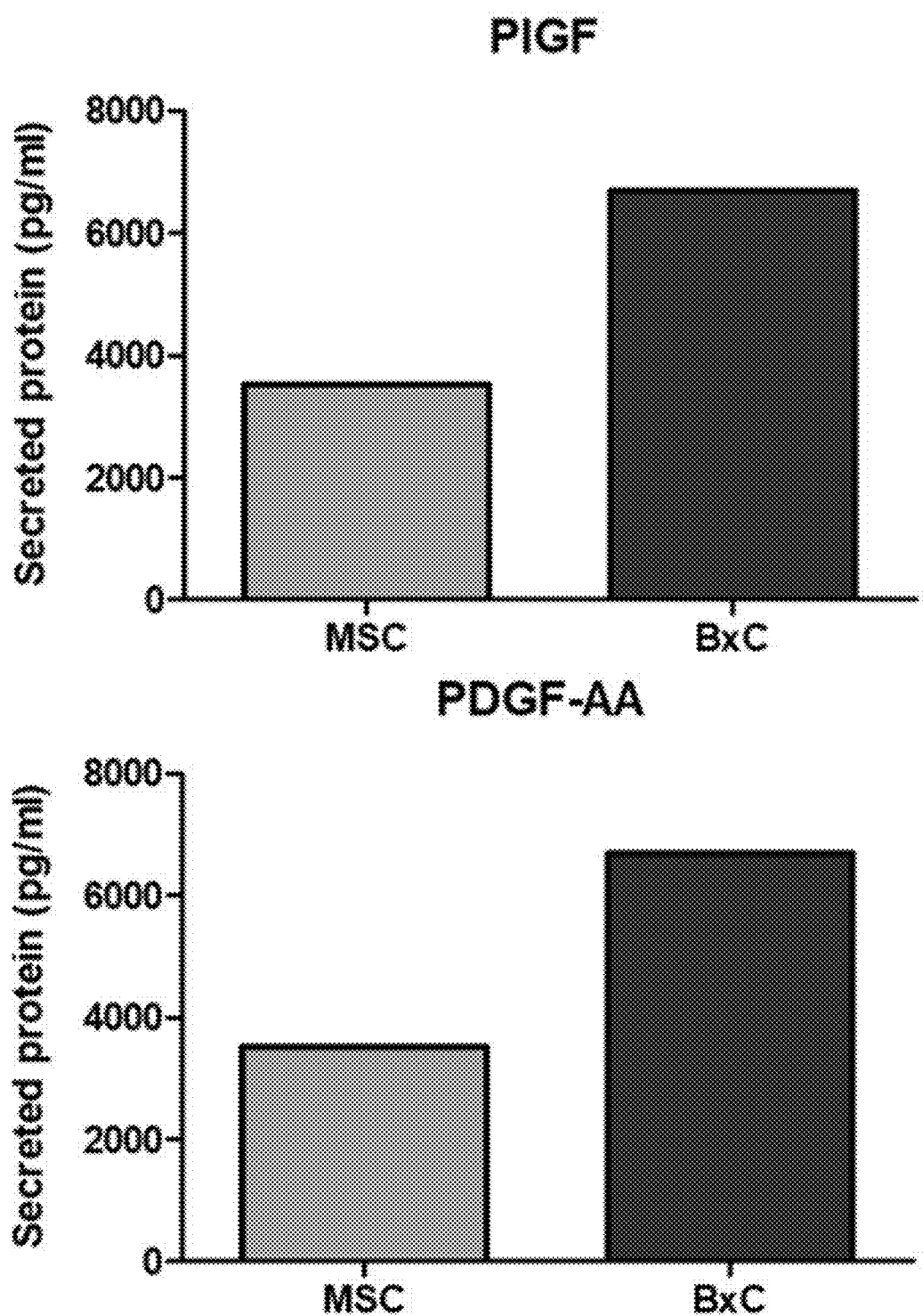
Figure 5D:
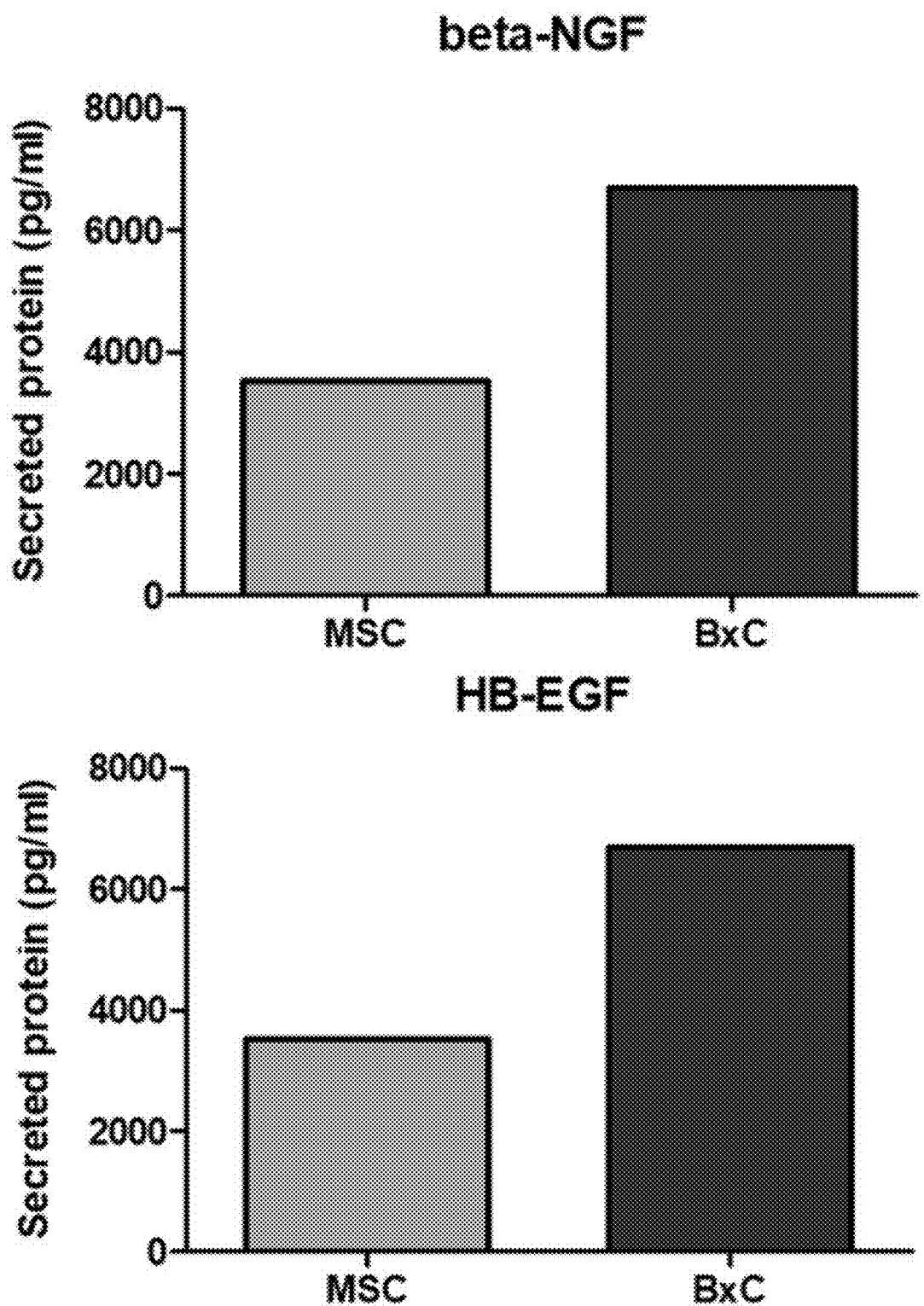

As shown in FIG. 4b, the induced pluripotent stem cell-derived functionally enhanced mesenchymal precursor cells (BxC) of the present disclosure showed at least 2-fold higher in the expression level of Ki67 as a cell proliferation indicator, compared with the mesenchymal stem cells (MSC).

It can be therefore seen that the induced pluripotent stem cell-derived functionally enhanced mesenchymal precursor cells (BxC) of the present disclosure had a very excellent effect in view of proliferative capacity compared with the mesenchymal stem cells (MSC).

Example 5: Comparison of Protein Secretory Capacity of Induced Pluripotent Stem Cell (iPSC)-derived Functionally Enhanced Mesenchymal Precursor Cells (BxC)

In order to compare the secretary capacity of functionality-associated proteins between the induced pluripotent stem cell-derived functionally enhanced mesenchymal stem cells (BxC) of the present disclosure and the induced pluripotent stem cell-derived mesenchymal stem cells (MSC), the following experiment was conducted.

The induced pluripotent stem cell-derived functionally enhanced mesenchymal stem cells (BxC) and the mesenchymal stem cells (MSC) with the same passage number were seeded in 6-well culture plates at 1×105 cells per well, and after 24 hours, the supernatants were removed. The wells were washed with DPBS, and 1 mL of serum-free medium was added thereto, and after 48 hours, the medium was removed. The dead cells or debris were precipitated by centrifugation at 300×g for 5 minutes, and then only the supernatants were taken, and stored at −80° C. The array kit was fabricated using custom service of Luminex High performance assay by R&D systems, and then Luminex assay was carried out.

TABLE 2

| Protein | MSC | BxC |
| --- | --- | --- |
| Endostatin | 3516.6 pg/ml | 6682.0 pg/ml |
| Endothelin-1 | 17.0 pg/ml | 79.4 pg/ml |
| VEGF-A | 32.2 pg/ml | 78.5 pg/ml |
| Thrombospondin-2 | 21802.9 pg/ml | 36912.7 pg/ml |
| PlGF | 5.8 pg/ml | 9.4 pg/ml |
| PDGF-AA | 29.2 pg/ml | 328.4 pg/ml |
| beta-NGF | 10.5 pg/ml | 17.3 pg/ml |
| HB-EGF | 3.9 pg/ml | 15.7 pg/ml |

As shown in FIGS. 5a to 5d, the induced pluripotent stem cell-derived functionally enhanced mesenchymal stem cells (BxC) of the present disclosure secreted relatively large amounts of proteins associated with functionality of mesenchymal stem cells (MSC), compared with the induced pluripotent stem cell-derived mesenchymal stem cells (MSC). It can be therefore seen that the induced pluripotent stem cell-derived functionally enhanced mesenchymal precursor cells (BxC) of the present disclosure had enhanced functionality compared with the mesenchymal stem cells (MSC).

Example 6: Investigation on Sternness of Induced Pluripotent Stem Cell (iPSC)-derived Functionally Enhanced Mesenchymal Precursor Cells (BxC)

In order to compare stemness between the induced pluripotent stem cell-derived functionally enhanced mesenchymal precursor cells (BxC) of the present disclosure and the mesenchymal stem cells (MSC), the following experiment was conducted.

The mesenchymal stem cells and the induced pluripotent stem cell-derived functionally enhanced mesenchymal precursor cells (BxC) were seeded in 100 mm-cell culture dishes containing 10 mL of culture medium [high-glucose DMEM (Gibco, Cat no. 11995-065), 10% Fetal bovine Serum (HyClone), 1% MEM Non-Essential Amino Acids Solution (100×) (Gibco, Cat no. 11140-050)] at 1000 cells per dish, and cultured for 21 days. The cultured cell-attached dishes were washed two times with PBS, and fixed with 95% methanol at room temperature for about 2 minutes. After the fixed cells were washed three times with PBS, a solution of 0.5% crystal violet [5 g of crystal violet (Sigma, C-3886, USA), 100 mL of methanol] was added, and then the cells were stained for 5 minutes, washed with wash, and then dried at room temperature. The number of colonies composed of 50 or more cells was counted in the respective dishes, and compared.

Figure 6A:
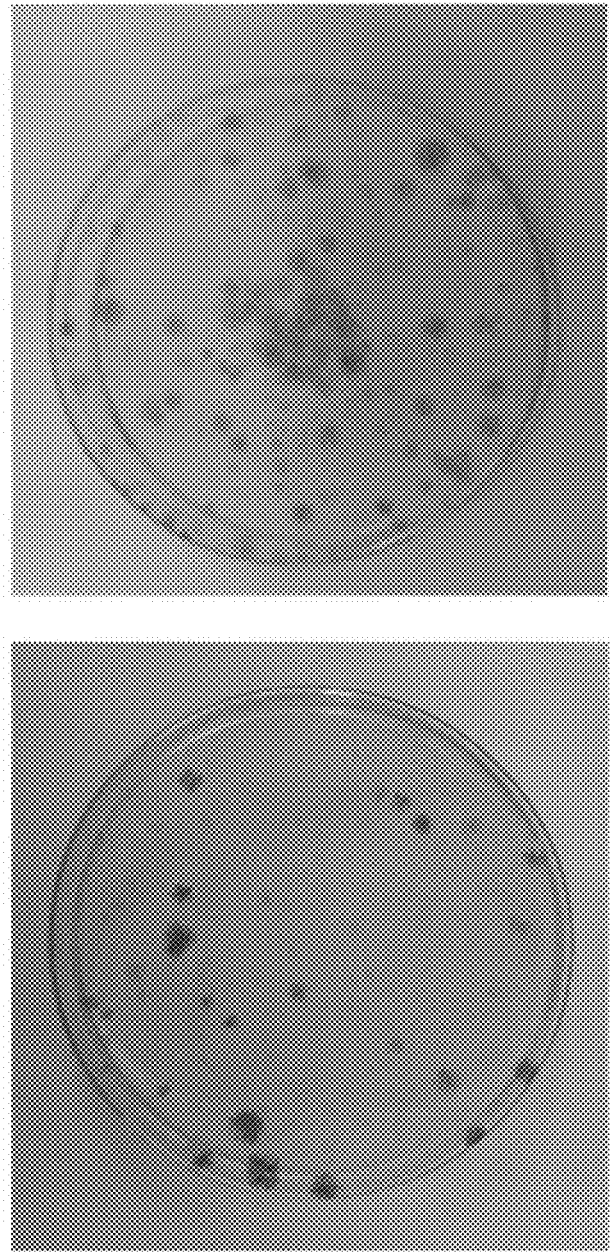
FIGS. 6a and 6b show CFU-F assay results to compare the proliferative capacity between the precursor cells of the induced pluripotent stem cell-derived mesenchymal stem cells (BxC) of the present disclosure and the same kind of tissue-derived mesenchymal stem cells (MSC).
Figure 6B:
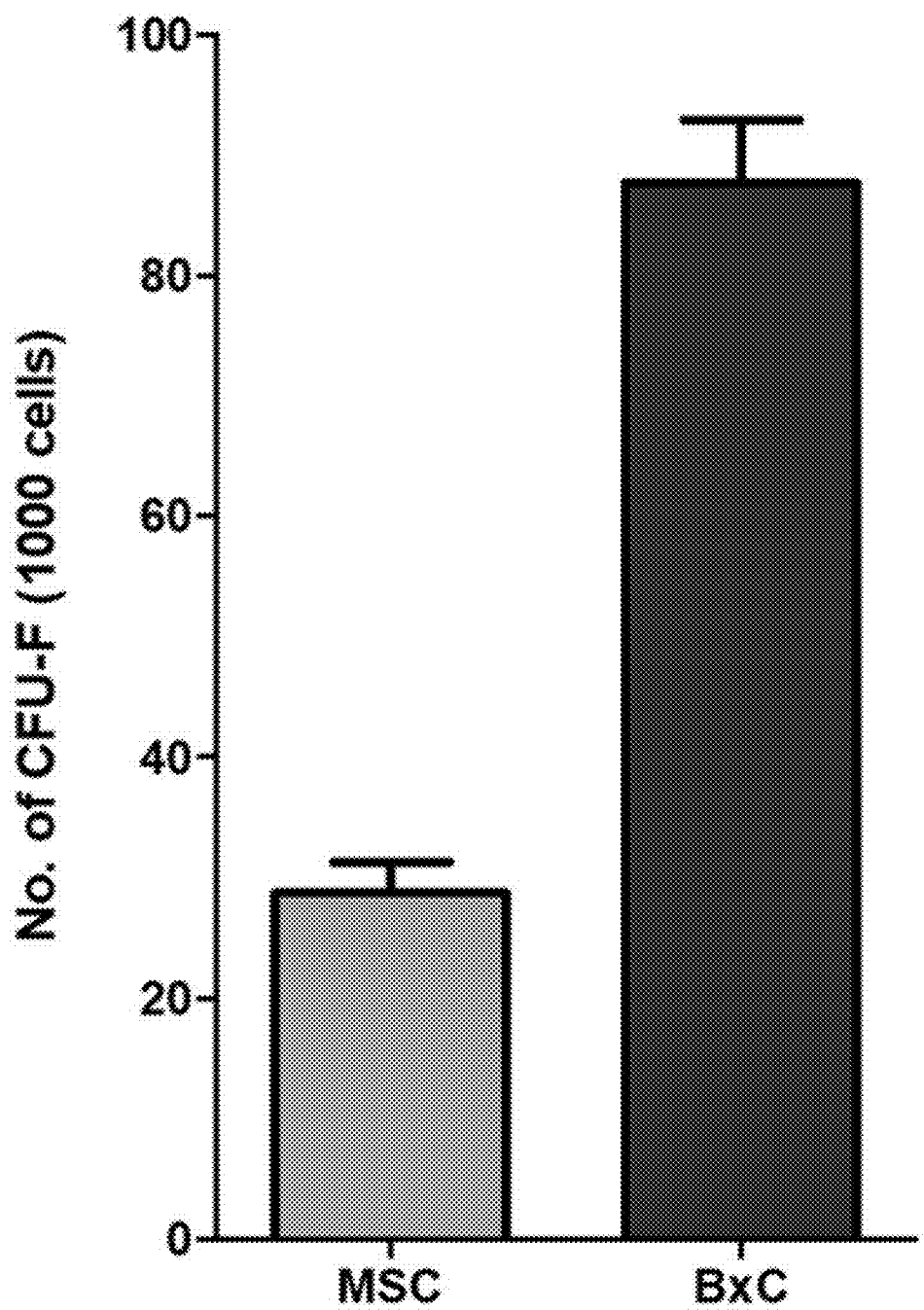

As shown in FIGS. 6a and 6b, the number of colony forming unit-fibroblasts (CFU-F) in the induced pluripotent stem cell-derived mesenchymal stem cells (MSC) was about three times or greater than that in the induced pluripotent stem cell-derived functionally enhanced mesenchymal precursor cells (BxC) of the present disclosure. It was therefore conformed that the induced pluripotent stem cell-derived functionally enhanced mesenchymal precursor cells (BxC) of the present disclosure had excellent stemness compared with the mesenchymal stem cells (MSC).

Example 7: Investigation on Characteristic Gene Expression Pattern of Induced Pluripotent Stem Cell (iPSC)-derived Functionally Enhanced Mesenchymal Precursor Cells (BxC)

In order to investigate a difference in gene expression pattern between the induced pluripotent stem cell-derived functionally enhanced mesenchymal precursor cells (BxC) of the present disclosure and the mesenchymal stem cells (MSC), mRNA was extracted from each cell population, and the gene expression level according to the cell type was compared by RNA-seq analysis.

Figure 7A:
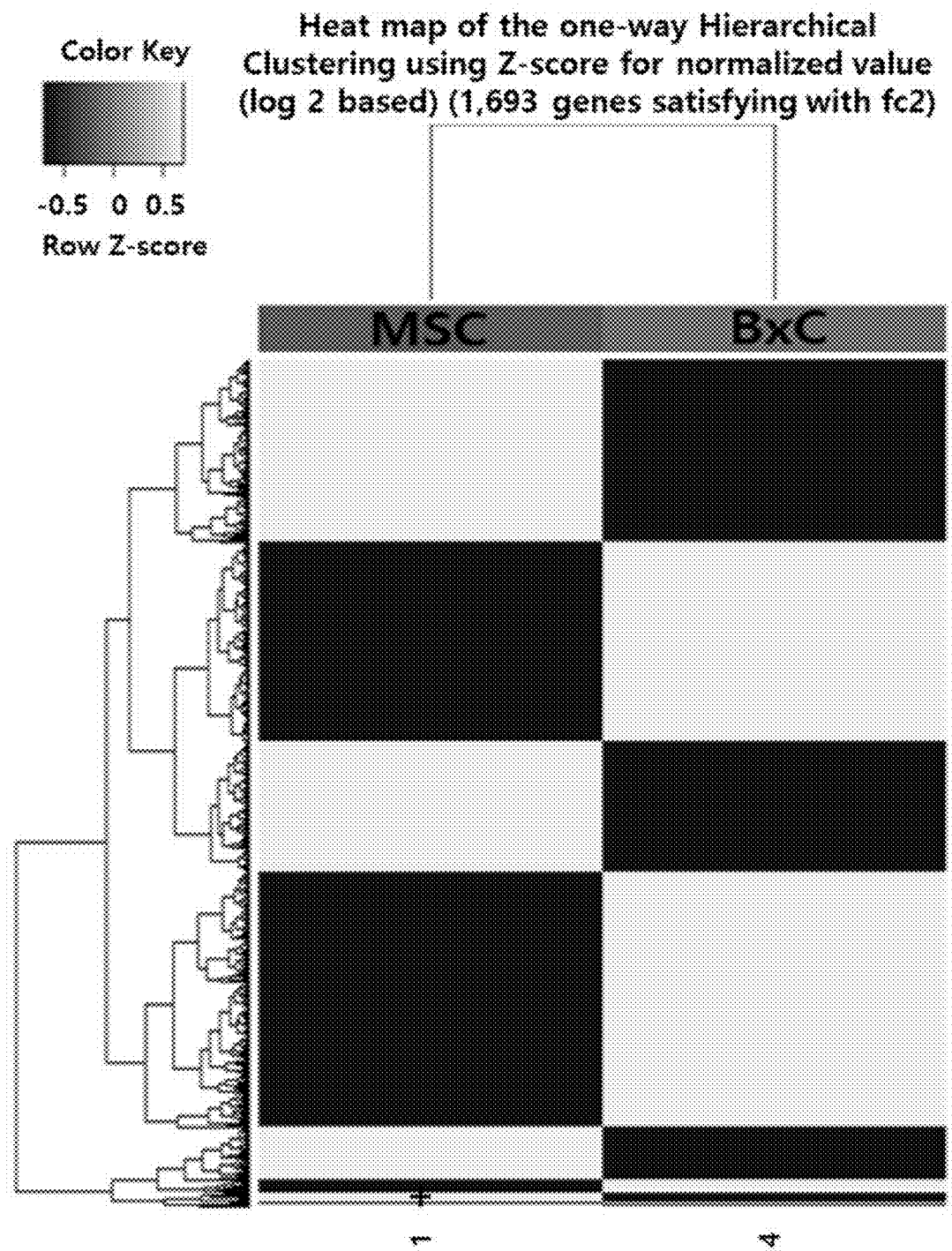
FIG. 7a shows a schematic view of the results of RNA-seq analysis performed to investigate genes showing a difference in expression level between the precursor cells of induced pluripotent stem cell-derived mesenchymal stem cells (BxC) and the same kind of tissue-derived mesenchymal stem cells (MSC).
Figure 7B:
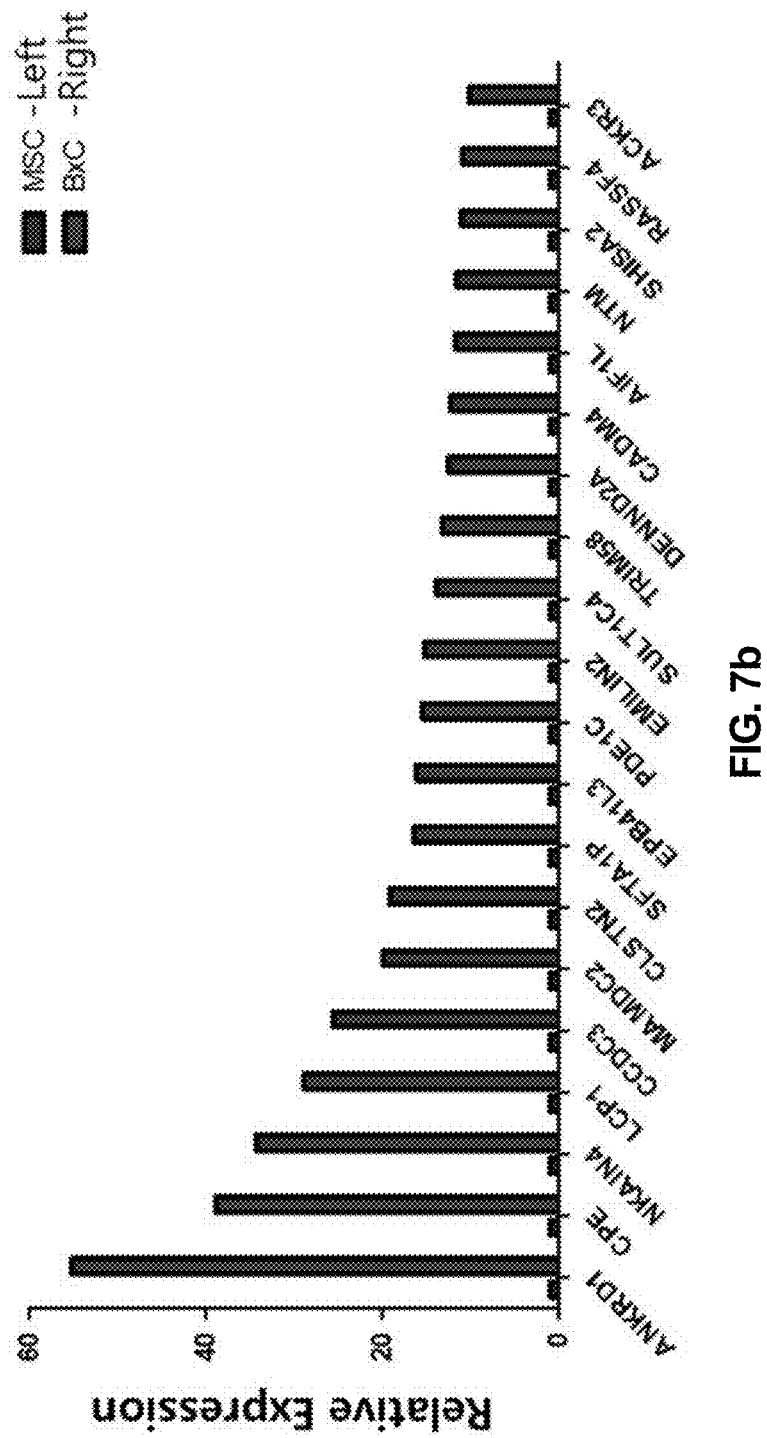
FIG. 7b shows genes expressed at higher levels in BxC compared with MSC.
Figure 7C:
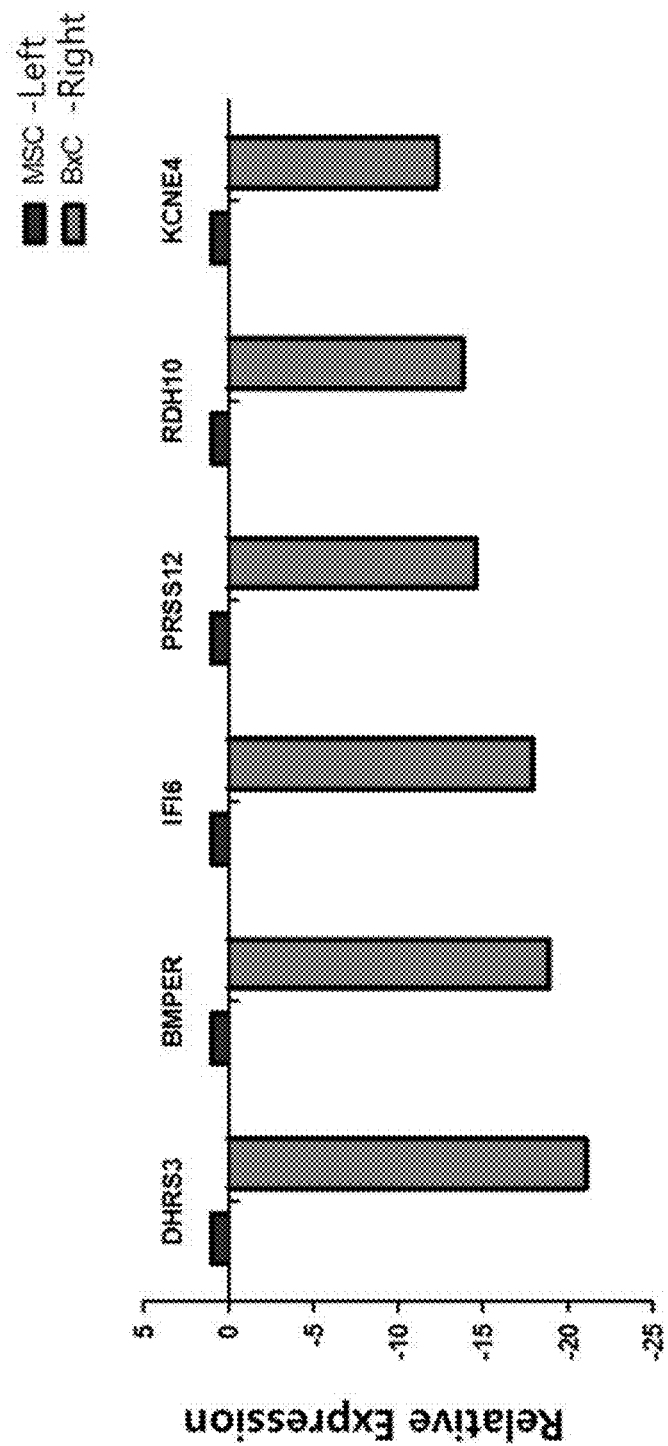
FIG. 7c shows genes expressed at lower levels in BxC compared with MSC.

The kind of gene showing a difference in gene expression level and the difference in gene expression level (gene expression level in BxC/gene expression level in MSC) are shown in Table 2 and FIGS. 7a to 7c.

As shown in FIGS. 7a to 7c, the gene expression levels of ANKRD1, CPE, NKAIN4, LCP1, CCDC3, MAMDC2, CLSTN2, SFTA1P, EPB41L3, PDE1C, EMILIN2, SULT1C4, TRIM58, DENND2A, CADM4, AIF1L, NTM, SHISA2, RASSF4, and ACKR3 were about at least 10-fold and about at most 55-fold higher in the induced pluripotent stem cell-derived functionally enhanced mesenchymal precursor cells (BxC) of the present disclosure compared with an equivalent number of mesenchymal stem cells (MSC).

Whereas, DHRS3, BMPER, IF16, PRSS12, RDH10, and KCNE4 were at least 10-fold and at most 20-fold less expressed in the induced pluripotent stem cell-derived functionally enhanced mesenchymal precursor cells (BxC) of the present disclosure.

Example 8: Isolation and Identification of Exosomes Derived from Induced Pluripotent Stem Cell (iPSC)-derived Functionally Enhanced Mesenchymal Stem Cells (BxC)

Figure 8A:
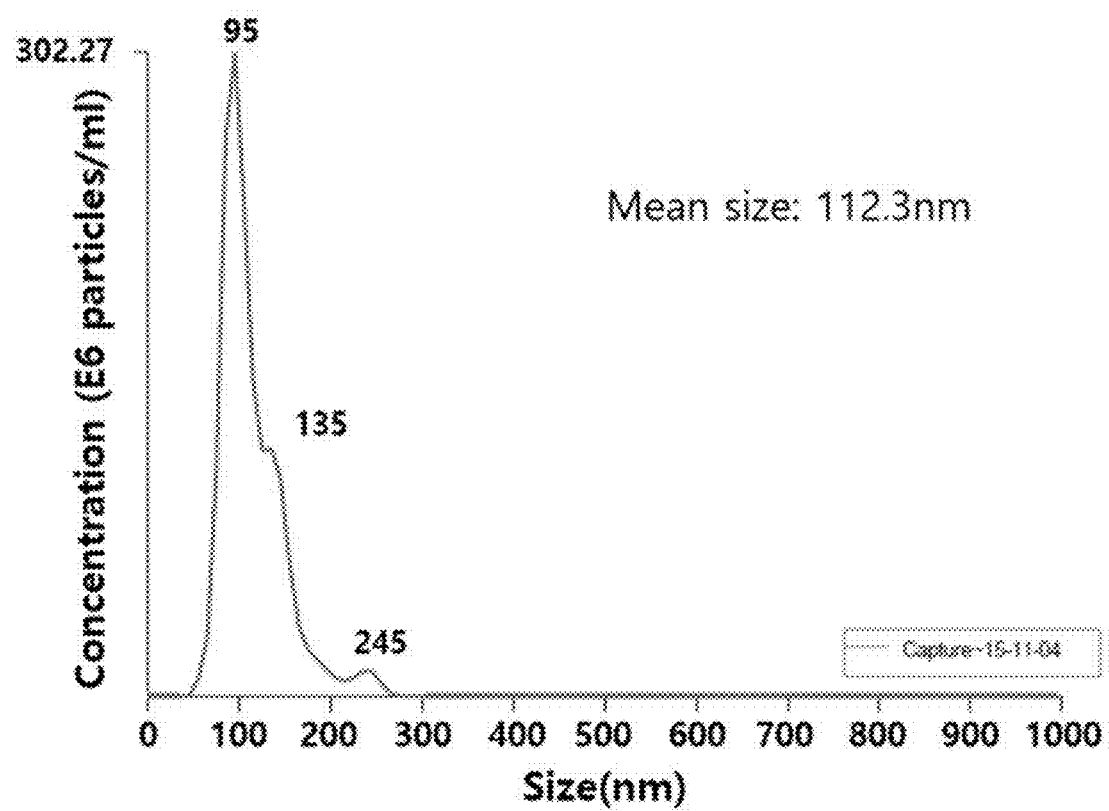
FIG. 8a is a graph confirming the number and size distribution of exosomes separated from BxC of the present disclosure.
Figure 8B:
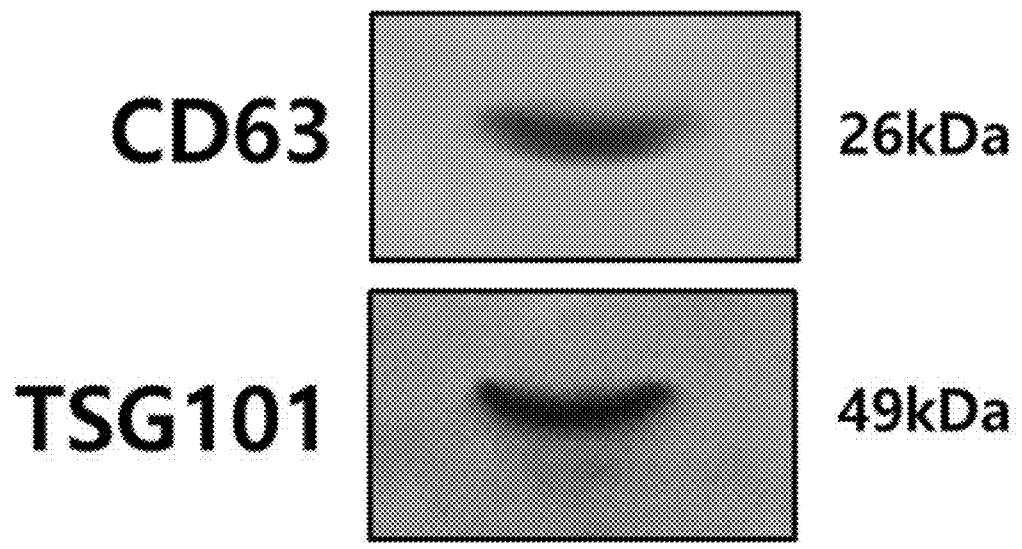
FIG. 8b is a graph identifying the expression of the exosome-specific surface antigens TSG101 and CD63.

The induced pluripotent stem cell-derived functionally enhanced mesenchymal precursor cells (BxC), prepared in Example 1, were further cultured in a culture medium containing 10% exosome-depleted FBS. After cell culture for 72 hours, the BxC cell culture medium was collected, and centrifuged at 300×g for 10 minutes to remove remaining cells and cell debris. The cell culture medium was centrifuged at 10000×g and 4° C. for 70 minutes using a high-speed centrifuge. The centrifuged supernatant was centrifuged at 100,000×g and 4° C. for 90 minutes using an ultracentrifuge to remove the supernatant, and the exosomes remaining below were diluted with phosphate buffered saline (PBS) before use. The separated exosomes were subjected to nanoparticle tracking assay (NanoSight NS300, Malvern), thereby investigating the number and size distribution of exosomes (FIG. 8a). The exosome-specific surface antigens TSG101 and CD63 were identified by western blot (FIG. 8b).

[Depository Authority] Korean Collection for Type Culture (KCTC)
[Accession Number] KCTC14019BP
[Date of Deposition] Nov. 11, 2019

What is claimed is:

1. A method for preparing induced pluripotent stem cell (iPSC)-derived mesenchymal stem cells, the method comprising:
    culturing induced pluripotent stem cells in a medium containing fetal bovine serum (FBS) and basic fibroblast growth factor (bFGF) for 1 to 10 days; and
    isolating SSEA-4(−) cells and culturing the SSEA-4(−) cells in a medium containing FBS and bFGF for 1 to 10 days.

2. The method of claim 1, wherein the medium contains 5 to 20% (v/v) FBS.

3. The method of claim 1, wherein the medium contains 1 to 20 ng/ml bFGF.

TABLE 3

| No. | Gene | Description | Fold Change |
|---|---|---|---|
| 1 | ANKRD1 | ankyrin repeat domain 1 | 55.1 |
| 2 | CPE | carboxypeptidase E | 38.8 |
| 3 | NKAIN4 | sodium/potassium transporting ATPase interacting 4 | 34.3 |
| 4 | LCP1 | lymphocyte cytosolic protein 1 | 28.8 |
| 5 | CCDC3 | coiled-coil domain containing 3 | 25.4 |
| 6 | MAMDC2 | MAM domain containing 2 | 19.9 |
| 7 | CLSTN2 | calsyntenin 2 | 19.1 |
| 8 | SFTA1P | surfactant associated 1, pseudogene | 16.4 |
| 9 | EPB41L3 | erythrocyte membrane protein band 4.1 like 3 | 16.1 |
| 10 | PDE1C | phosphodiesterase 1C | 15.4 |
| 11 | EMILIN2 | elastin microfibril interfacer 2 | 15.1 |
| 12 | SULT1C4 | sulfotransferase family 1C member 4 | 13.8 |
| 13 | TRIM58 | tripartite motif containing 58 | 13.2 |
| 14 | DENND2A | DENN domain containing 2A | 12.5 |
| 15 | CADM4 | cell adhesion molecule 4 | 12.2 |
| 16 | AIF1L | allograft inflammatory factor 1 like | 11.6 |
| 17 | NTM | neurotrimin | 11.5 |
| 18 | SHISA2 | shisa family member 2 | 11.0 |
| 19 | RASSF4 | Ras association domain family member 4 | 10.9 |
| 20 | ACKR3 | atypical chemokine receptor 3 | 10.1 |

4. A method for producing exosomes, the method comprising:
 culturing induced pluripotent stem cells in a medium containing FBS and bFGF for 1 to 10 days;
 isolating SSEA-4(−) cells and culturing the SSEA-4(−) cells in a medium containing FBS and bFGF for 1 to 10 days;
 further culturing the cultured SSEA-4(−) cells in a cell culture medium; and
 separating exosomes from the cell culture medium.

5. The method of claim 4, wherein the cell culture medium contains exosome-depleted fetal bovine serum.

* * * * *